US012689985B2

(12) United States Patent
Tsai et al.

(10) Patent No.: US 12,689,985 B2
(45) Date of Patent: **\*Jul. 21, 2026**

(54) METHODS AND APPARATUSES FOR POWER SAVING OPERATIONS

(71) Applicant: SHARP KABUSHIKI KAISHA, Sakai City (JP)

(72) Inventors: Hsin-Hsi Tsai, Taipei (TW); Chia-Hung Wei, Taipei (TW); Yu-Hsin Cheng, Taipei (TW); Wan-Chen Lin, Taipei (TW); Chie-Ming Chou, Taipei (TW)

(73) Assignee: SHARP KABUSHIKI KAISHA, Sakai City (JP)

( \* ) Notice: Subject to any disclaimer, the term of this patent is extended or adjusted under 35 U.S.C. 154(b) by 308 days.

This patent is subject to a terminal disclaimer.

(21) Appl. No.: 18/374,163

(22) Filed: Sep. 28, 2023

(65) Prior Publication Data

US 2024/0023023 A1 Jan. 18, 2024

Related U.S. Application Data

(63) Continuation of application No. 17/837,428, filed on Jun. 10, 2022, now Pat. No. 11,818,660, which is a continuation of application No. 17/033,125, filed on Sep. 25, 2020, now Pat. No. 11,405,868.

(60) Provisional application No. 62/909,965, filed on Oct. 3, 2019.

(51) Int. Cl.
*H04W 52/02* (2009.01)
*H04W 72/23* (2023.01)
*H04W 76/27* (2018.01)

(52) U.S. Cl.
CPC ....... *H04W 52/0235* (2013.01); *H04W 72/23* (2023.01); *H04W 76/27* (2018.02)

(58) Field of Classification Search
None
See application file for complete search history.

(56) References Cited

U.S. PATENT DOCUMENTS

| | | | | |
|---|---|---|---|---|
| 11,405,868 | B2 * | 8/2022 | Tsai | H04W 52/0216 |
| 11,818,660 | B2 * | 11/2023 | Tsai | H04W 52/0219 |
| 2019/0132109 | A1 * | 5/2019 | Zhou | H04L 27/2607 |
| 2019/0254110 | A1 | 8/2019 | He et al. | |
| 2019/0297577 | A1 * | 9/2019 | Lin | H04W 52/0235 |

(Continued)

OTHER PUBLICATIONS

Qualcomm Incorporated: "Fast SCG and SCell Activation", R1-1907306, 3GPP TSG-RAN WG1 #97 Reno, USA, May 13-17, 2019.

*Primary Examiner* — Clemence S Han
(74) *Attorney, Agent, or Firm* — ScienBiziP, P.C.

(57) ABSTRACT

A method for a User Equipment (UE) for performing a dormant operation is provided. The method receives, from a Base Station (BS), a Radio Resource Control (RRC) configuration indicating a set of one or more dormancy cell groups, where a group of serving cells belongs to a specific dormancy cell group in the set of one or more dormancy cell groups. The method receives, from the BS, a signal including a bitmap when the UE is not in a Discontinuous Reception (DRX) active time, and switches, based on a bit in the bitmap that is associated with the specific dormancy cell group, active Bandwidth Parts (BWPs) of all activated serving cells included in the group of serving cells to a dormant BWP or to a non-dormant BWP.

20 Claims, 9 Drawing Sheets

(56) References Cited

U.S. PATENT DOCUMENTS

| | | | |
|---|---|---|---|
| 2020/0107266 A1* | 4/2020 | Liao | H04W 76/28 |
| 2021/0021397 A1* | 1/2021 | Kim | H04L 1/1896 |
| 2021/0050987 A1* | 2/2021 | Hsieh | H04W 72/23 |
| 2021/0051640 A1* | 2/2021 | Pao | H04W 72/044 |
| 2022/0007221 A1* | 1/2022 | Wang | H04W 72/23 |
| 2022/0210866 A1* | 6/2022 | He | H04L 5/0048 |

* cited by examiner

METHODS AND APPARATUSES FOR POWER SAVING OPERATIONS

CROSS-REFERENCE TO RELATED APPLICATION(S)

This application is a continuation application of U.S. patent application Ser. No. 17/837,428, filed on Jun. 10, 2022, entitled "METHODS AND APPARATUSES FOR POWER SAVING OPERATIONS," which is a continuation application of U.S. patent application Ser. No. 17/033,125, filed on Sep. 25, 2020, entitled "METHODS AND APPA-RATUSES FOR POWER SAVING OPERATIONS," which claims the benefit of and priority to U.S. Provisional Patent Application Ser. No. 62/909,965, filed on Oct. 3, 2019, entitled "Method and apparatus for power saving signal." The contents of all of the above-named applications are hereby incorporated herein fully by reference for all pur-poses.

FIELD

The present disclosure generally relates to wireless com-munications and, more specifically, to methods and appara-tuses for power saving operations (e.g., dormant operations).

BACKGROUND

With the tremendous growth in the number of connected devices and the rapid increase in user/network traffic vol-ume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communica-tion (mMTC), and Ultra-Reliable and Low-Latency Com-munication (URLLC).

However, as the demand for radio access continues to increase, there is a need for further improvements in wireless communication for the next-generation wireless communi-cation system.

SUMMARY

The present disclosure is directed to methods and appa-ratuses for power saving operations.

According to a first aspect of the present disclosure, a method performed by a User Equipment (UE) for power saving operations is provided. The method includes the UE receiving a first Radio Resource Control (RRC) configura-tion indicating at least one dormancy cell group, and receiv-ing a second RRC configuration indicating a first Bandwidth Part (BWP) (on which the UE is configured with a dormant operation), for a serving cell. The dormant operation includes the UE performing a Channel State Information (CSI) measurement and stopping monitoring a Physical Downlink Control Channel (PDCCH). The serving cell belongs to a dormancy cell group of the at least one dormancy cell group. The method further includes the UE receiving a third RRC configuration indicating a second BWP, on which the UE is not configured with the dormant operation, for the serving cell, receiving a Power Saving Signal (PSS) including a bitmap. Each bit in the bitmap is associated with one of the at least one dormancy cell group. The method further includes determining an active BWP of the serving cell as the first BWP after determining that a bit associated with the dormancy cell group in the bitmap is set to a first value, and determining the active BWP of the serving cell as the second BWP after determining that the bit is set to a second value.

According to a second aspect of the present disclosure, a UE for power saving operations is provided. The UE includes a memory and at least one processor coupled to the memory. The at least one processor is configured to receive a first RRC configuration indicating at least one dormancy cell group, and receive a second RRC configuration indi-cating a first BWP (on which the UE is configured with a dormant operation) for a serving cell. The dormant operation includes the UE performing a CSI measurement and stop-ping monitoring a PDCCH. The serving cell belongs to a dormancy cell group of the at least one dormancy cell group. The at least one processor is further configured to receive a third RRC configuration indicating a second BWP (on which the UE is not configured with the dormant operation) for the serving cell, receive a PSS including a bitmap. Each bit in the bitmap is associated with one of the at least one dormancy cell group. The at least one processor is further configured to determine an active BWP of the serving cell as the first BWP after determining that a bit associated with the dormancy cell group in the bitmap is set to a first value, and determine the active BWP of the serving cell as the second BWP after determining that the bit is set to a second value.

According to a third aspect of the present disclosure, a method for a User Equipment (UE) for performing a dor-mant operation is provided. The method includes receiving, from a Base Station (BS), a Radio Resource Control (RRC) configuration indicating a set of one or more dormancy cell groups, where a group of serving cells belongs to a specific dormancy cell group in the set of one or more dormancy cell groups; receiving, from the BS, a signal including a bitmap, each bit of the bitmap being associated with a respective dormancy cell group in the set of one or more dormancy cell groups; and switching, based on a bit in the bitmap that is associated with the specific dormancy cell group, active Bandwidth Parts (BWPs) of all serving cells included in the group of serving cells to a dormant BWP or to a non-dormant BWP.

In some implementations of the third aspect of the present disclosure, the method further includes performing the dor-mant operation on a specific serving cell included in the group of serving cells in a case that the active BWP of the specific serving cell is the dormant BWP.

In some implementations of the third aspect of the present disclosure, the dormant operation includes performing a Channel State Information (CSI) measurement; and forgo-ing monitoring a Physical Downlink Control Channel (PDCCH).

In some implementations of the third aspect of the present disclosure, the dormant operation includes at least one of performing Automatic Gain Control (AGC) for a specific serving cell included in the group of serving cells, or performing beam management for the specific serving cell.

In some implementations of the third aspect of the present disclosure, the method further includes forgoing monitoring a Physical Downlink Control Channel (PDCCH) on a spe-cific serving cell included in the group of serving cells in a case that the active BWP of the specific serving cell is the dormant BWP; and monitoring the PDCCH on the specific serving cell in a case that the active BWP of the specific serving cell is the non-dormant BWP.

In some implementations of the third aspect of the present disclosure, the signal is received via Downlink Control Information (DCI) that is scrambled by a Power Saving-Radio Network Temporary Identifier (PS-RNTI).

In some implementations of the third aspect of the present disclosure, the signal further includes a wake-up indicator for starting a Discontinuous Reception (DRX) On-duration timer (drx-onDurationTimer) at a beginning of a DRX cycle.

In some implementations of the third aspect of the present disclosure, the method further includes receiving a configuration of a Discontinuous Reception (DRX) operation from the BS.

In some implementations of the third aspect of the present disclosure, the method further includes forgoing monitoring the signal on a Physical Downlink Control Channel (PDCCH) monitoring occasion when the UE is in a Discontinuous Reception (DRX) active time, where the PDCCH monitoring occasion is configured for the signal; and monitoring the signal on the PDCCH monitoring occasion when the UE is not in the DRX active time.

In some implementations of the third aspect of the present disclosure, the active BWP of a specific serving cell included in the group of serving cells is a Downlink (DL) BWP.

According to a fourth aspect of the present disclosure, a User Equipment (UE) for performing a dormant operation is provided. The UE includes transmitting and receiving circuitry and at least one processor coupled to the transmitting and receiving circuitry. The at least one processor is configured to receive, by the transmitting and receiving circuitry, a Radio Resource Control (RRC) configuration indicating a set of one or more dormancy cell groups from a Base Station (BS), where a group of serving cells belongs to a specific dormancy cell group in the set of one or more dormancy cell groups; receive, by the transmitting and receiving circuitry, a signal including a bitmap from the BS, each bit of the bitmap being associated with a respective dormancy cell group in the set of one or more dormancy cell groups; and switch, based on a bit in the bitmap that is associated with the specific dormancy cell group, active Bandwidth Parts (BWPs) of all serving cells included in the group of serving cells to a dormant BWP or to a non-dormant BWP.

In some implementations of the fourth aspect of the present disclosure, the at least one processor is further configured to perform the dormant operation on a specific serving cell included in the group of serving cells in a case that the active BWP of the specific serving cell is the dormant BWP.

In some implementations of the fourth aspect of the present disclosure, the dormant operation includes performing a Channel State Information (CSI) measurement; and forgoing monitoring a Physical Downlink Control Channel (PDCCH).

In some implementations of the fourth aspect of the present disclosure, the dormant operation includes at least one of: performing Automatic Gain Control (AGC) for a specific serving cell included in the group of serving cells, or performing beam management for the specific serving cell.

In some implementations of the fourth aspect of the present disclosure, the at least one processor is further configured to forgo monitoring a Physical Downlink Control Channel (PDCCH) on a specific serving cell included in the group of serving cells in a case that the active BWP of the specific serving cell is the dormant BWP; and monitor the PDCCH on the specific serving cell in a case that the active BWP of the specific serving cell is the non-dormant BWP.

In some implementations of the fourth aspect of the present disclosure, the signal is received via Downlink Control Information (DCI) that is scrambled by a Power Saving-Radio Network Temporary Identifier (PS-RNTI).

In some implementations of the fourth aspect of the present disclosure, the signal further includes a wake-up indicator for starting a Discontinuous Reception (DRX) On-duration timer (drx-onDurationTimer) at a beginning of a DRX cycle.

In some implementations of the fourth aspect of the present disclosure, the at least one processor is further configured to receive, by the transmitting and receiving circuitry, a configuration of a Discontinuous Reception (DRX) operation from the BS.

In some implementations of the fourth aspect of the present disclosure, the at least one processor is further configured to forgo monitoring the signal on a Physical Downlink Control Channel (PDCCH) monitoring occasion when the UE is in a Discontinuous Reception (DRX) active time, where the PDCCH monitoring occasion is configured for the signal; and monitor the signal on the PDCCH monitoring occasion when the UE is not in the DRX active time.

In some implementations of the fourth aspect of the present disclosure, the active BWP of a specific serving cell included in the group of serving cells is a Downlink (DL) BWP.

According to a fifth aspect of the present disclosure, a method for a User Equipment (UE) for performing a dormant operation is provided. The method includes receiving, from a Base Station (BS), a Radio Resource Control (RRC) configuration indicating a set of one or more dormancy cell groups, where a group of serving cells belongs to a specific dormancy cell group in the set of one or more dormancy cell groups; receiving, from the BS, a signal including a bitmap when the UE is not in a Discontinuous Reception (DRX) active time; and switching, based on a bit in the bitmap that is associated with the specific dormancy cell group, active Bandwidth Parts (BWPs) of all activated serving cells included in the group of serving cells to a dormant BWP or to a non-dormant BWP.

In some implementations of the fifth aspect of the present disclosure, the method further includes performing the dormant operation on a specific serving cell included in the group of serving cells in a case that the active BWP of the specific serving cell is the dormant BWP.

In some implementations of the fifth aspect of the present disclosure, the dormant operation includes: performing a Channel State Information (CSI) measurement; and forgoing monitoring a Physical Downlink Control Channel (PDCCH).

In some implementations of the fifth aspect of the present disclosure, the dormant operation includes at least one of: performing Automatic Gain Control (AGC) for a specific serving cell included in the group of serving cells, or performing beam management for the specific serving cell.

In some implementations of the fifth aspect of the present disclosure, the method further includes forgoing monitoring a Physical Downlink Control Channel (PDCCH) on a specific serving cell included in the group of serving cells in a case that the active BWP of the specific serving cell is the dormant BWP; and monitoring the PDCCH on the specific serving cell in a case that the active BWP of the specific serving cell is the non-dormant BWP.

In some implementations of the fifth aspect of the present disclosure, receiving the signal includes receiving the signal via Downlink Control Information (DCI) that is scrambled by a Power Saving-Radio Network Temporary Identifier (PS-RNTI).

In some implementations of the fifth aspect of the present disclosure, the signal further includes a wake-up indicator for starting a DRX On-duration timer (drx-onDuration-Timer) at a beginning of a DRX cycle.

In some implementations of the fifth aspect of the present disclosure, the method further includes receiving a configuration of a DRX operation from the BS.

In some implementations of the fifth aspect of the present disclosure, the method further includes forgoing monitoring the signal on a Physical Downlink Control Channel (PDCCH) monitoring occasion when the UE is in the DRX active time, where the PDCCH monitoring occasion is configured for the signal.

In some implementations of the fifth aspect of the present disclosure, the active BWP of a specific serving cell included in the group of serving cells is a Downlink (DL) BWP.

According to a sixth aspect of the present disclosure, a User Equipment (UE) for performing a dormant operation is provided. The UE includes transmitting and receiving circuitry and at least one processor coupled to the transmitting and receiving circuitry. The at least one processor configured to receive, by the transmitting and receiving circuitry, a Radio Resource Control (RRC) configuration indicating a set of one or more dormancy cell groups from a Base Station (BS), where a group of serving cells belongs to a specific dormancy cell group in the set of one or more dormancy cell groups; receive, by the transmitting and receiving circuitry, a signal including a bitmap from the BS when the UE is not in a Discontinuous Reception (DRX) active time; and switch, based on a bit in the bitmap that is associated with the specific dormancy cell group, active Bandwidth Parts (BWPs) of all activated serving cells included in the group of serving cells to a dormant BWP or to a non-dormant BWP.

In some implementations of the sixth aspect of the present disclosure, the at least one processor is further configured to perform the dormant operation on a specific serving cell included in the group of serving cells in a case that the active BWP of the specific serving cell is the dormant BWP.

In some implementations of the sixth aspect of the present disclosure, the dormant operation includes performing a Channel State Information (CSI) measurement; and forgoing monitoring a Physical Downlink Control Channel (PDCCH).

In some implementations of the sixth aspect of the present disclosure, the dormant operation includes at least one of performing Automatic Gain Control (AGC) for a specific serving cell included in the group of serving cells, or performing beam management for the specific serving cell.

In some implementations of the sixth aspect of the present disclosure, the at least one processor is further configured to forgo monitoring a Physical Downlink Control Channel (PDCCH) on a specific serving cell included in the group of serving cells in a case that the active BWP of the specific serving cell is the dormant BWP; and monitor the PDCCH on the specific serving cell in a case that the active BWP of the specific serving cell is the non-dormant BWP.

In some implementations of the sixth aspect of the present disclosure, receiving the signal includes receiving the signal via Downlink Control Information (DCI) that is scrambled by a Power Saving-Radio Network Temporary Identifier (PS-RNTI).

In some implementations of the sixth aspect of the present disclosure, the signal further includes a wake-up indicator for starting a DRX On-duration timer (drx-onDuration-Timer) at a beginning of a DRX cycle.

In some implementations of the sixth aspect of the present disclosure, the at least one processor is further configured to receive, by the transmitting and receiving circuitry, a configuration of a DRX operation from the BS.

In some implementations of the sixth aspect of the present disclosure, the at least one processor is further configured to forgo monitoring the signal on a Physical Downlink Control Channel (PDCCH) monitoring occasion when the UE is in the DRX active time, where the PDCCH monitoring occasion is configured for the signal.

In some implementations of the sixth aspect of the present disclosure, the active BWP of a specific serving cell included in the group of serving cells is a Downlink (DL) BWP.

BRIEF DESCRIPTION OF THE DRAWINGS

Aspects of the present disclosure are best understood from the following detailed disclosure when read with the accompanying figures. Various features are not drawn to scale. Dimensions of various features may be arbitrarily increased or reduced for clarity of discussion.

DESCRIPTION

Figure 1:
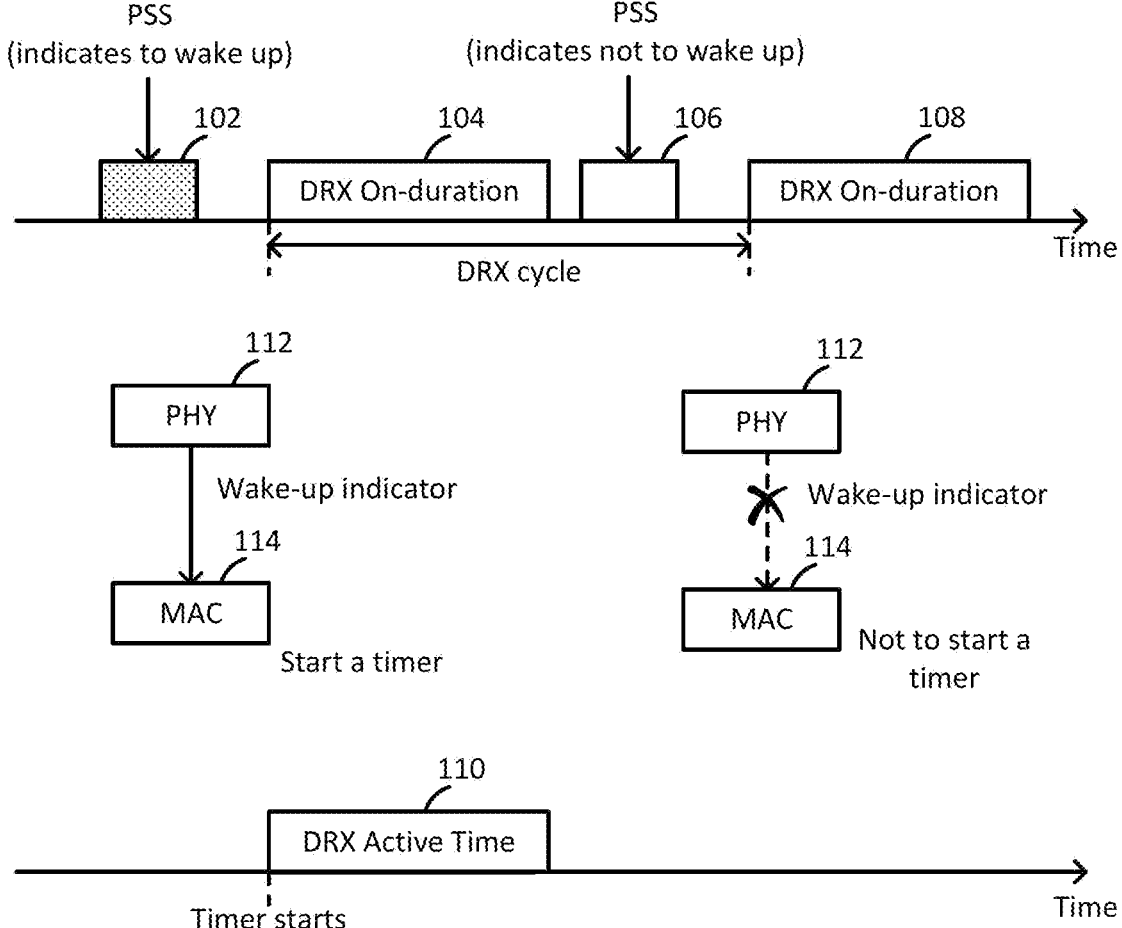
FIG. 1 illustrates an example of a PSS scheme in accordance with an implementation of the present disclosure.

Some of the terms mentioned in the present disclosure are illustrated as follows. Unless otherwise specified, the terms in the present disclosure have the following meanings.

Abbreviation Full Name

3GPP 3$^{rd}$ Generation Partnership Project
5G 5$^{th}$ generation
ACK Acknowledgement
AGC Automatic Gain Control
BA Bandwidth Adaptation
BWP Band Width Part
CA Carrier Aggregation CC Component Carrier
CE Control Element
CG Cell Group
CORESET Control Resource Set
CSI Channel State Information
CSI-RS Channel State Information based Reference Signal
CQI Channel Quality Information
DC Dual Connectivity
DCI Downlink Control Information
DL Downlink
DRX Discontinuous Reception
FR Frequency Range
IE Information Element
MAC Medium Access Control
MCG Master Cell Group
MIMO Multi-Input Multi-Output
NACK Negative Acknowledgement
NR New RAT/Radio
NW Network
PCell Primary Cell
PSCell Primary Secondary Cell
PSS Power Saving Signal/Channel
PS-RNTI Power Saving Radio Network Temporary Identifier
PDCCH Physical Downlink Control Channel
PDCP Packet Data Convergence Protocol
PDSCH Physical Downlink Shared Channel
PDU Protocol Data Unit
PHY Physical
PRACH Physical Random Access Channel
PUCCH Physical Uplink Control Channel
PUSCH Physical Uplink Shared Channel
PTAG Primary Timing Advanced Group
RA Random Access
RLC Radio Link Control
RNTI Radio Network Temporary Identifier
RRC Radio Resource Control
RS Reference Signal
RF Radio Frequency
SCell Secondary Cell
SCG Secondary Cell Group
SCS Sub-Carrier Spacing
SDAP Service Data Adaptation Protocol
SFN System Frame Number
WUS Wake Up Signaling
SINR Signal to Interference plus Noise Ratio
SpCell Special Cell
SR Scheduling Request
SRS Sounding Reference Signal
TRP Transmission/Reception Point
TS Technical Specification
UE User Equipment
UL Uplink
UL-SCH Uplink Shared Channel
WUS Wake Up Signal The following disclosure contains specific information pertaining to the example implementations in the present disclosure. The drawings in the present disclosure and their accompanying detailed disclosure are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure so described may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the so-described combination, group, series, and the equivalent. Besides, the terms "system" and "network" described in the present disclosure may be used interchangeably.

The term "and/or" herein is only an association relationship for describing associated objects and represents that three relationships may exist. For example, A and/or B may represent that: A exists alone, A and B exist at the same time, and B exists alone. "A and/or B and/or C" may represent that at least one of A, B, and C exists. Besides, the character "/" used herein generally represents that the former and latter associated objects are in an "or" relationship.

Additionally, for a non-limiting explanation, specific details, such as functional entities, techniques, protocols, standards, and the like, are set forth for providing an understanding of the described technology. In other examples, a detailed disclosure of well-known methods, technologies, systems, architectures, and the like are omitted so as not to obscure the present disclosure with unnecessary details.

Persons skilled in the art will immediately recognize that any network function(s) or algorithm(s) described in the present disclosure may be implemented by hardware, software, or a combination of software and hardware. Described functions may correspond to modules that may be software, hardware, firmware, or any combination thereof. The software implementation may include computer-executable instructions stored on a computer-readable medium such as memory or other types of storage devices. For example, one or more microprocessors or general-purpose computers with communication processing capability may be programmed with corresponding executable instructions and carry out the described network function(s) or algorithm(s). The microprocessors or general-purpose computers may be formed of Application-Specific Integrated Circuits (ASICs), programmable logic arrays, and/or one or more Digital Signal Processors (DSPs). Although some of the example implementations described in this specification are oriented to software installed and executing on computer hardware, alternative example implementations implemented as firmware, as hardware, or as a combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) may typically include at least one Base Station (B S), at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a Next-Generation Core (NGC), or an Internet), through a Radio Access Network (RAN) established by the BS.

It should be noted that, in the present disclosure, a UE may include, but is not limited to, a mobile station, a mobile terminal or device, or a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols mentioned above.

The BS may be operable to provide radio coverage to a specific geographical area using multiple cells included in the RAN. The BS may support the operations of the cells. Each cell may be operable to provide services to at least one UE within its radio coverage. More specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmissions). The BS may communicate with one or more UEs in the radio communication system through the several cells. A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3GPP, may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, and the UL transmission data should also be configurable, for example, based on the network dynamics of NR. Besides, an SL resource may also be provided in an NR frame to support ProSe services.

UE battery life may strongly affect the user's experience and influence the adoption of 5G NR handsets and/or services. The power efficiency for 5G NR UE(s) can be better than that for LTE UE(s), and techniques and designs for improvements have been identified and adopted. For example, techniques such as UE adaptation in Frequency (e.g., BWP and/or CA/DC), UE adaptation in Time (e.g., PSS mechanism), and/or UE adaptation in traffic (e.g., dynamic maximum MIMO layer configuration) are provided to improve UE's power efficiency.

UE BWP adaptation or Bandwidth Adaptation (BA) may refer to a procedure that a BS (e.g., gNB) may dynamically switch the UE's active (DL/UL) BWP based on the traffic to support efficient operations of BWP switching (or "BWP switch"), thereby reducing the UE's power consumption. To enable BA on a PCell, the gNB may configure the UE with UL BWP(s) and DL BWP(s). To enable BA on SCells under CA, the gNB may at least configure the UE with DL BWP(s) (e.g., there may be no UL BWP(s)). For a PCell, the initial BWP may be the BWP used for initial access. For an SCell, the initial BWP may be the BWP configured for the UE to first operate at SCell activation. With BA, the reception and transmission bandwidth of a UE does not need to be as large as the bandwidth of the cell and can be adjusted. For example, the bandwidth may be ordered to change (e.g., to shrink during the period of low activity to save power), the location of the bandwidth may be adjusted in the frequency domain (e.g., to increase scheduling flexibility), and the subcarrier spacing may be ordered to change (e.g., to allow different services). A subset of the total cell bandwidth of a cell may refer to a BWP. BA may be achieved by configuring a UE with one or more BWPs and notifying the UE which of the configured BWPs is currently active. A UE configured to operate in the BWPs of a serving cell may be configured with a set of BWPs for DL receptions (e.g., a DL BWP set), e.g., by a parameter BWP-Downlink (e.g., specified in the 3GPP TS 38.331 V15.5.0); the UE may also be configured with a set of BWPs for UL transmissions (e.g., a UL BWP set), e.g., by parameter BWP-Uplink.

BWP switch for a serving cell may refer to a procedure used to activate an inactive BWP and deactivate an active BWP at a time. BWP switch may be controlled by a PDCCH (e.g., indicating a DL assignment or an UL grant), a BWP inactivity timer (bwp-InactivityTimer), RRC signaling, or the MAC entity (upon the initiation of an RA procedure). Upon the RRC (re-)configuration of firstActiveDownlinkBWP-Id and/or firstActiveUplinkBWP-Id for an SpCell or the activation of an SCell, the DL BWP and UL BWP indicated by firstActiveDownlinkBWP-Id and firstActiveUplinkBWP-Id, respectively, may become active even if a PDCCH indicating a DL assignment or an UL grant is not received. The active BWP for a serving cell may be indicated by RRC signaling or a PDCCH. For the unpaired spectrum, a DL BWP may be paired with a UL BWP. BWP switch may be common for both UL and DL transmissions.

UE adaptation to CA may allow a BS (e.g., a gNB) to rapidly activate/deactivate an SCell based on the traffic, in order to support efficient operations for fast SCell activation/deactivation and achieve UE power saving. In CA, two or more CCs are aggregated. A UE may simultaneously receive or transmit on one or multiple CCs depending upon the UE's capability. CA may support both contiguous and non-contiguous CCs. When CA is deployed, frame timing and SFN may be aligned across the cells that can be aggregated. To enable reasonable UE battery consumption when CA is configured, the activation/deactivation mechanism of cells is provided. When an SCell is deactivated, the UE does not need to monitor the PDCCH(s) or PDSCH(s) corresponding to the deactivated SCell and does not perform UL transmissions corresponding to the deactivated SCell. In addition, the UE may not need to perform CQI measurements. Conversely, when an SCell is activated, the UE may need to monitor the corresponding PDSCH(s) and PDCCH(s) (if the UE is configured to monitor PDCCH on this SCell) and is expected to be able to perform CQI measurements on the SCell.

The UE power saving schemes with UE adaptation to the traffic may be used to reduce the maximum number of antenna/panels or MIMO layers semi-statically or dynamically indicated by the NW to achieve the purpose of UE power saving. The NW may indicate the maximum MIMO layer to be used for PDSCH and/or PUSCH transmissions in all BWPs of a serving cell. Based on the maximum number of MIMO layers (denoted as $L_{max}$), a UE can activate/deactivate its antenna-related elements to reduce the power consumption. For example, the UE may activate the smallest number of the antenna-related elements that is enough to receive the $L_{max}$ MIMO layers. The antenna-related elements may refer to a set of components including RF chain(s), RF path(s) (mixer(s), power amplifier(s), phase shifter(s), etc.), panel(s), physical antenna elements(s), etc. The set of components may be turned on/off based on UE implementation, and therefore, the impact from the antenna adaptation can be different for each UE.

For UE adaptation in the time domain, a UE may be configured with a DRX operation that controls the UE's PDCCH monitoring activity. With the DRX operation, the UE may monitor PDCCH(s) according to specific requirements (e.g., specified in the 3GPP TS 38.321 V15.5.0). When operating in the RRC_CONNECTED state and if the DRX operation is configured, for all the activated serving cells, the UE may monitor the PDCCH discontinuously during the DRX operation; otherwise, the UE may monitor the PDCCH in a normal way (e.g., specified in the 3GPP TS 38.213 V15.5.0).

PSS/WUS Mechanism

A PSS may include a WUS indication (e.g., a wake-up indicator). The PSS may trigger a UE (or the MAC entity of the UE) to "wake up" to monitor a PDCCH for the next occurrence of the DRX On-duration (e.g., to start drx-onDuration Timer). The PSS may be configured jointly with DRX operation. For example, the PSS may be configured only when the DRX operation is configured.

FIG. 1 illustrates an example of a PSS scheme in accordance with an implementation of the present disclosure. As illustrated in FIG. 1, the PSS may be monitored at the occasion(s) (e.g., the PSS monitoring occasion 102 and/or 106) located at a configured offset before the start of a timer (e.g., drx-onDurationTimer). On the PSS monitoring occasion 102 and/or 106 that a UE receives the PSS, if the UE is indicated to wake up (e.g., to monitor the PDCCH) on a DRX cycle by a wake-up indicator included in the PSS, the UE may start the drx-onDurationTimer at the beginning of the DRX cycle. Otherwise, the UE may not start the drx-onDuration Timer at the beginning of the DRX cycle. For example, once the UE receives the PSS, the PHY layer 112 of the UE may provide a wake-up indicator to the MAC entity 114 of the UE. Then the UE (or MAC entity 114) may start the timer (e.g., drx-onDurationTimer) at the beginning of an associated DRX cycle. If the PHY layer 112 does not provide a wake-up indicator to the MAC entity 114, the UE (or MAC entity 114) may not start the timer (e.g., drx-onDurationTimer) at the beginning of the associated DRX cycle.

In one implementation, if the UE monitors the PSS monitoring occasion 102 and the PSS is detected (and/or the wake-up indicator of the PSS indicates to the UE to wake up), the UE may start the drx-onDurationTimer at the beginning of the subsequent DRX cycle (e.g., at the beginning of the DRX On-duration 104). On the other hand, if the UE monitors a PSS monitoring occasion (e.g., the PSS monitoring occasion 106) but no PSS is detected (and/or the PSS indicates to the UE not to wake up), the UE may not start the timer (e.g., drx-onDurationTimer) at the beginning of the subsequent DRX cycle. Besides, the UE may not monitor the PSS during the DRX active time 110. That is, the UE may only monitor the PSS outside the DRX active time 110. If the UE is in the DRX active time during a PSS monitoring occasion, the UE may start the drx-onDuration-Timer at its next occasion.

In one implementation, the PSS may (only) be configured on the PCell in case of CA and the SpCell in case of DC (e.g., the PCell in an MCG and a PSCell in an SCG). A new (UE-specific) RNTI (e.g., PS-RNTI) may be introduced for PSS decoding. A UE-specific configuration of the search space set(s) may be dedicated to the PSS for the UE to monitor. The CORESET for the PSS may be configured with the same or different CORESET(s) configured for other PDCCH monitoring. One or more than one monitoring occasions may be configured an offset (e.g., a slot or multiple slots) before the DRX On-duration or DRX cycle. UE may (only) monitor the PSS on the active (DL) BWP in an active cell.

MIMO Layer Adaptation

In the 3GPP release 15, the maximum number of MIMO layers (which may be denoted as $L_{max}$) may be configured per a cell basis by higher layer signaling (by PDSCH-ServingCellConfig for DL and PUSCH-ServingCellConfig for UL). The indicated maximum number of MIMO layers may be used for PDSCH/PUSCH transmissions in all BWPs of the serving cell. Dynamic antenna adaptation (based on UE implementation) may still be supportable even if $L_{max}$ is a per-cell configuration. However, configuring $L_{max}$ on a cell basis may be an inefficient way when there is no or less traffic. For example, if a UE is configured with multiple BWPs and the bwp-InactivityTimer expires due to no traffic, the UE may switch its active BWP to a default BWP (e.g., a narrow BWP). However, the UE may still need to activate its antennas based on the per-cell configured $L_{max}$, even if the UE has operated in the default BWP. In view of this, if the default BWP can be configured with different values of $L_{max}$, the gNB may configure a smaller $L_{max}$ value for the default BWP, so that the UE can deactivate one or more antennas when the default BWP is activated, thereby reducing the UE's power consumption. For example, $L_{max}$ may be configured per a BWP basis. The gNB may instruct a UE to switch its BWP dynamically for antenna adaptation. In this situation, the maximum number of MIMO layers, $L_{max}$, may be configured per a BWP basis, and the UE may use this per-BWP configured $L_{max}$ value and ignore the per-cell configured $L_{max}$ value (e.g., provided in the PDSCH-ServingCellConfig IE and/or PUSCH-ServingCellConfig IE) when operating in the (default) BWP. If the maximum number of MIMO layers is not configured for a BWP, the UE may turn to use the per-cell configured $L_{max}$ value when operating in the BWP.

Figure 2:
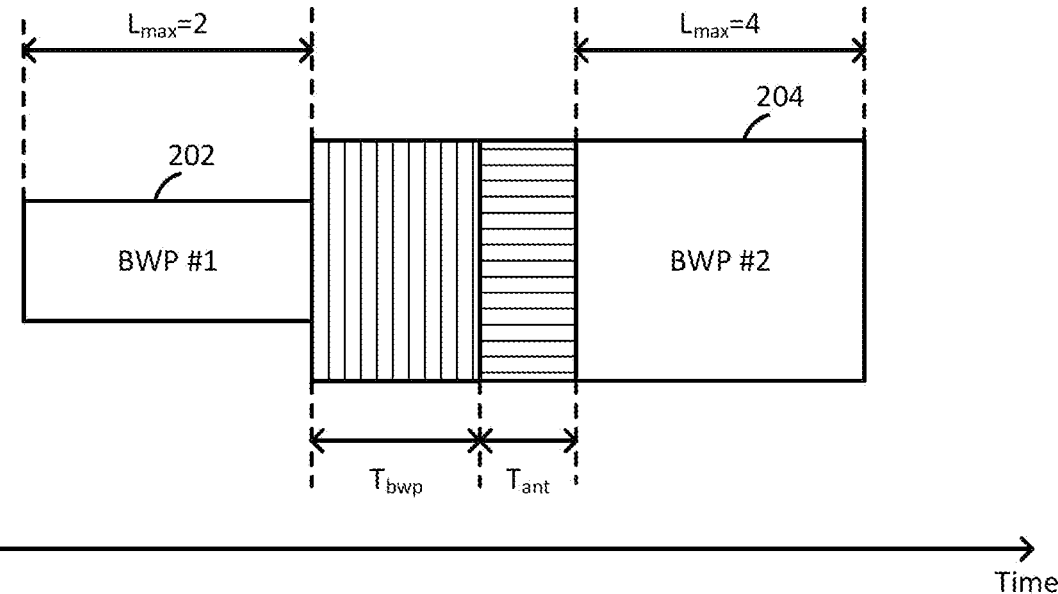
FIG. 2 illustrates an example of the adaptation of the maximum number of antennas and/or Multi-Input Multi-Output (MIMO) layers, in accordance with an implementation of the present disclosure.
Figure 2:

FIG. 2 illustrates an example of the adaptation of the maximum number of antennas and/or MIMO layers, in accordance with an implementation of the present disclosure. In the present implementation, the maximum number of MIMO layers, $L_{max}$, can be separately configured for each BWP. As illustrated in FIG. 2, the $L_{max}$ is 2 for the BWP #1 202 and is 4 for the BWP #2 204. Thus, compared to operating in the BWP #2 204, the UE 222 can activate fewer antennas (e.g., only two of four receive antennas are activated) when operating in the BWP #1 202. In this way, the power consumption of the UE 222 can be dynamically adjusted through a BWP switch.

As described above, configuring the maximum number of MIMO layers on a BWP basis may reduce UE's power consumption. In order to change the maximum number of MIMO layers, the NW may indicate the BWP switch for the UE to change the BWP and the maximum number of MIMO layers associated with the target BWP. For example, scheduling DCI (and/or PDCCH) may be used for the BWP switch during the DRX active time. However, a time gap/delay (e.g., $T_{ant}$) for an antenna switch (e.g., the activation/deactivation of one or more antennas) may be required at the UE side. Therefore, if a UE changes its active BWP and antennas together, the time gap/delay $T_{ant}$ for the antenna switch may be required in addition to the BWP switch delay (e.g., $T_{bwp}$). On the other hand, the adaptation of the maximum number of MIMO layers may lead to data interruption. Additionally, the number of affected slots may become larger as SCS is increased, reducing in a reduction of the scheduling flexibility. Thus, in some implementations, a method of performing the adaptation of the maximum number of MIMO layers (and/or BWPs) before a DRX On-duration and/or DRX cycle or outside the DRX active time may be applied. When a BWP switch takes place before a DRX On-duration, data interruption or possible time delay due to the BWP switch and/or antenna switch can be avoided or alleviated because the BWP switch has finished before data scheduling. In one implementation, the method can be achieved by including a BWP index in the PSS (and/or the WUS). In this way, the PSS may be used to indicate the BWP switch. Other implementations may be described in the following.

The following cases describe UE operations performed based on PSS(s).

Case #1: Switch BWP(s) of One or Multiple Serving Cells Via PSS

In one implementation, a PSS may be configured only on a PCell (in case of CA) and/or an SpCell (in case of DC), where the SpCell may be a PCell in an MCG or a PSCell in an SCG. In other words, the PSS may not be configured on the SCell(s). Thus, the UE may only receive the PSS on a PCell or an SpCell from the NW, and may not receive the PSS on the SCell(s) from the NW.

A serving cell may be configured with one or multiple BWPs, and the corresponding BWP operation (e.g., BWP switch and/or BWP-related timer operations) may be controlled per serving cell. Methods of using a PSS to switch the BWP(s) of one or multiple or all serving cells is provided.

A UE may perform a BWP switch on a serving cell(s) if the UE receives a PSS (e.g., on an SpCell).

In one implementation, the PSS may switch only the BWP of an SpCell (e.g., a PCell or a PSCell). For example, the PSS may be configured only on the SpCell. In this situation, the UE may only monitor the PSS on the SpCell and not monitor the PSS on the SCell(s). If the UE receives a PSS on the SpCell, and the PSS instructs the UE to switch the BWP, the UE may switch only the BWP of the SpCell and may not switch the BWP of the SCell(s). In addition, the UE may start or restart a timer (e.g., bwp-InactivityTimer) only for the SpCell and may not start or restart the timer for the SCell(s). The PSS may not include the SCell-related information (e.g., SCell ID), and therefore, the PSS may not instruct the UE to perform a BWP switch for other SCell(s).

In one implementation, PSS can indicate a BWP switch of a specific serving cell(s). For example, the PSS may indicate a BWP switch on each serving cell (or all the serving cells). The PSS may be configured only on the SpCell. The UE may monitor the PSS only on the SpCell, and the UE may not monitor the PSS on the SCell(s). If the UE receives a PSS on the SpCell, and the PSS indicates to the UE to switch the BWP, the UE may switch the BWP of each (activated) serving cell(s). The UE may switch the BWP of different (activated) serving cell(s) to a specific BWP. The UE may switch the BWP of different (activated) serving cell(s) to different BWPs. The specific BWP may be determined based on the disclosed implementations. The UE may switch the BWP of each (activated) serving cell(s) to a specific BWP indicated by the PSS. The UE may switch the BWP of each (activated) serving cell(s) to a BWP, where the BWP may be pre-configured by RRC signaling. In another example, the PSS may indicate a BWP switch on a group of serving cells. The group(s) of the serving cell(s) may be configured by the NW (e.g., via RRC signaling, MAC CE, etc.). The number of cell(s) in a group may be zero, one, or more than one.

For example, the NW may configure a group of the serving cell(s) for a UE. If the UE receives the PSS (e.g., on the SpCell) that indicates a BWP switch of the group of the serving cell(s), the UE may switch the BWP(s) of all the (activated) serving cell(s) included in the group of the serving cell(s) to a specific BWP. The specific BWP may be preconfigured by the NW and/or predefined in the 3GPP specification (e.g., default/initial BWP). Alternatively, the UE may switch the BWP(s) of all the (activated) serving cell (s) included in the group of the serving cell(s) to different BWPs. The NW may preconfigure different BWPs for each serving cell. For example, the NW may configure a BWP #1 to a serving cell #1, and the NW may configure a BWP #2 to a serving cell #2, where the cell #1 and the cell #2 are configured in the same group. If the UE receives the PSS that indicates a BWP switch of the group of the serving cell(s), the UE may switch the BWP of the serving cell #1 to the BWP #1 and may switch the BWP of the serving cell #2 to the BWP #2.

For example, the NW may configure two groups of the serving cell(s) for a UE. A first group of the serving cell(s) may include an SCell #1 and an SCell #2, and a second group of the serving cell(s) may include an SCell #3 and an SCell #4. If the UE receives the PSS (e.g., on the SpCell) that indicates a BWP switch for the first group of the serving cell(s) (e.g., via a first indicator included in the PSS), the UE may perform a BWP switch for the first group of the serving cell(s), e.g., the UE may perform a BWP switch for all the serving cells configured in the first group. If the UE receives the PSS (e.g., on the SpCell) that indicates a BWP switch for the second group of the serving cell(s) (e.g., via a second indicator included in the PSS), the UE may perform a BWP switch for the second group, e.g., the UE may perform a BWP switch for all the serving cells configured in the second group. If the PSS indicates a BWP switch for a group of serving cell(s) but the number of serving cells in the group is zero, the UE may perform a BWP switch of a serving cell with corresponding cell index included in the PSS. Furthermore, the UE may switch the BWP(s) of all the (activated) serving cell(s) included in the group of serving cell(s) to a specific BWP or to different BWPs for each (activated) serving cell(s). Each serving cell may belong to zero, one, or multiple groups.

In one implementation, the PSS may implicitly indicate a BWP switch based on where (e.g., time/frequency resource occasion) the PSS is received. The NW may configure one or multiple PSS monitoring occasions (e.g., on different time/frequency resources or different cells) to a UE. The time/frequency resource(s) or different cells may be preconfigured by the gNB via DL RRC message(s). The UE may determine the cell(s) on which BWP switch should be performed based on the PSS monitoring occasion on which the UE receives the PSS. The correspondence or association between a PSS monitoring occasion and a cell(s) may be configured by the NW or predetermined according to the 3GPP specification. A PSS monitoring occasion may be associated with one or multiple cells. Alternatively, a PSS monitoring occasion may be associated with one or multiple groups of serving cells.

For example, when the UE receives a PSS on a first cell and the PSS indicates a BWP switch, the UE may need to perform a BWP switch for the first cell. When the UE receives a PSS on a second cell, and the PSS indicates a BWP switch, the UE may need to perform a BWP switch for the second cell. The UE may not perform BWP switch for other cell(s) if the UE does not receive a PSS on the other cell(s).

For example, a UE may monitor PSS(s) in several search spaces, CORESETs, or combinations thereof. When the UE receives a PSS (indicating BWP switch) in a first search space, a first CORESET, or a combination thereof, the UE may need to perform a BWP switch for a first cell associated with the first search space/the first CORESET. When the UE receives a PSS (indicating BWP switch) in a second search space, a second CORESET, or combination thereof other than the first cell/first CORESET, the UE may need to perform a BWP switch for the second cell. The UE may not perform BWP switch for other cell(s) where the PSS is associated with different search spaces, CORESETs, or combinations thereof.

For example, the gNB may preconfigure multiple searchspaceID (e.g., specified in the 3GPP TS 38.331) for a PSS associated with multiple serving cells (e.g., SpCell, SCell). Each of the searchspaceID may be associated with one or more serving cells. When the UE receives a PSS on a PDCCH associated with the search space, the UE may need to perform a BWP switch for the corresponding serving cells.

In one implementation, the PSS may explicitly indicate BWP switch on a specific serving cell (e.g., via cell index). The PSS may include the BWP information (e.g., BWP index) and/or the Cell information (e.g., cell index). The PSS may indicate to the UE to switch the active BWP to a specific BWP (e.g., indicated by the BWP information) and/or indicate the UE to switch the BWP of a specific cell (e.g., indicated by the cell information). The PSS may include cell information of one or more than one cell. The information of cell(s) may be indicated/configured by another DL signaling which is not the PSS (e.g., a MAC CE or an RRC signaling). The PSS may be used for cross-carrier BWP switch. For example, the UE may receive the PSS on a first cell (e.g., SpCell) and perform the BWP switch on a second cell (e.g., SCell) based on the PSS.

For example, if a UE's current active BWP of a first cell is a first BWP, when the UE receives a PSS that includes a second BWP ID and includes the first cell's ID, the UE may switch the active BWP from the first BWP of the first cell to a second BWP of the first cell.

For example, the PSS may indicate to the UE to switch the active BWP of all the (activated) serving cells (of the UE) to an indicated BWP (if the PSS includes BWP information but without cell information) or to an indicated BWP of an indicated cell (if the PSS includes both the BWP information and cell information).

More specifically, if the cell ID included in the PSS is 0 or a specific value, the UE may perform a BWP switch of the SpCell or perform BWP switch of all the (activated) serving cells (of the UE). Alternatively, if the PSS does not have any field that indicates a cell ID, the UE may perform a BWP switch of the SpCell or perform BWP switch of all the (activated) serving cells (of the UE). It is noted that performing BWP switch of a serving cell (e.g., an SpCell) may refer to switching one BWP on the serving cell to another BWP on the serving cell.

In one implementation, if the UE receives a PSS for BWP switch for a serving cell while an RA procedure associated with the serving cell is ongoing, the UE may stop/abort the ongoing RA procedure and switch the BWP for the serving cell indicated by the PSS.

In one implementation, if the UE receives a PSS for BWP switch for a serving cell while an RA procedure associated with the serving cell is ongoing, it is up to UE implementation whether to switch the active BWP for the serving cell or ignore the PSS for BWP switch (except that the PSS indicates to the UE to switch the active BWP for the serving cell to a specific BWP).

In one implementation, a PSS may indicate BWP switch to a specific BWP for one or more or a group of cells. The PSS may have a field to include a BWP ID. The PSS may have a field with only one bit to indicate whether the UE should switch the BWP or the one or more or group of cells. If the PSS indicates to the UE to switch the BWP for the one or more or group of cells, the UE may switch the current active BWP to a specific BWP for the serving cell. If the current active BWP for the serving cell is the same as the specific BWP for the one or more or group of cells, the UE may not perform a BWP switch for the one or more or group of cells. The specific BWP for the one or more or group of cells may be preconfigured by NW or specified in the specification.

For example, the PSS may (only and/or implicitly) indicate to the UE to switch the BWP for one or more or group of cells to the initial/default BWP. For example, when the UE receives a PSS (e.g., on the PSS monitoring occasion of SpCell), and the PSS indicates to the UE to switch the BWP for the one or more or group of cells, the UE may switch the current BWP for the one or more or group of cells to the initial/default BWP. The UE should switch which cell's BWP may be based on the implementations disclosed previously.

For example, the PSS may (only and/or implicitly) indicate BWP switch for one or more or group of cells to a specific BWP. For example, when the UE receives a PSS (e.g., on the PSS monitoring occasion of an SpCell), and the PSS indicates to the UE to switch the BWP for one or more or group of cells, the UE may switch the current BWP for one or more or group of cells to the specific BWP. The specific BWP may be one of the BWP configured in BWP-Downlink, BWP-DownlinkCommon, firstActiveDownlinkBWP, and/or BWP-DownlinkDedicated. The specific BWP may be one of the UL BWP configured in BWP-Uplink, BWP-UplinkCommon, firstActiveUplinkBWP and/or BWP-UplinkDedicated. The specific BWP may be configured in a configuration of PSS. The specific BWP may be configured in a case that the PSS is configured. The specific BWP may be a BWP with a narrow bandwidth. The specific BWP may be configured for power saving (e.g., the specific BWP may be a dormant BWP). The UE may determine which cell's BWP should be switched based on the implementations described above.

For example, the PSS may indicate to a UE to switch the BWP to a specific BWP for one or more or group of cells that is explicitly indicated by the PSS. The PSS may indicate to the UE to switch the current active BWP to which BWP by including a BWP ID. For example, if the UE's current active BWP is BWP ID #1, then when the UE receives a PSS (e.g., on the PSS monitoring occasion of the SpCell) and the PSS includes BWP ID #2, the UE may switch the active BWP to another BWP with BWP ID #2. The UE may determine which cell's BWP should be switched based on the implementations described above. If the BWP ID included in the PSS is the same as the UE's active BWP, the UE may not switch the BWP. For example, the UE may ignore the PSS for the BWP switch in this case.

For example, the PSS may indicate to the UE to switch the BWP to a specific BWP for one or more or a group of cells in an implicit way. For example, when the UE receives a PSS (e.g., on the PSS monitoring occasion of the SpCell), and the PSS indicates to the UE to switch the BWP for the one or more or group of cells, the UE may determine which BWP to switch to for the one or more or group of cells based on where the UE receives the PSS (e.g., on specific time/ frequency resource(s) or different cells). For example, the different CORSESETs/search spaces may be associated with different BWPs.

In another example, the gNB may preconfigure multiple search space IDs (e.g., parameters each denoted as searchspaceID, as specified in the 3GPP TS 38.331) associated with multiple BWPs for a PSS. Each searchspaceID may be associated with a specific BWP. When the UE receives a PSS on a PDCCH associated with the search space, the UE may need to perform a BWP switch for one or more or group of cells to switch to the BWP corresponding to the searchspaceID.

In one implementation, if a PSS does not include any BWP/cell information, or the BWP/cell information includes a specific BWP ID/specific cell ID, the UE may not need to perform a BWP switch. If the PSS indicates a BWP ID that is the same as the active BWP ID for a cell, the UE may not perform the BWP switch on the cell.

In one implementation, if the PSS (e.g., monitored/received on the PSS occasion) indicates to the UE to wake up (e.g., via a wake-up indicator), the UE may not switch the active BWP. If the PSS indicates to the UE not to wake up (or to go to sleep), the UE may switch the active BWP to a specific BWP. The specific BWP may be a default BWP, an initial BWP, a narrow BWP, and/or a specific BWP for power saving. The specific BWP may be indicated/preconfigured by NW or specified in the 3GPP specification.

In one implementation, if the PSS (e.g., monitored/received on the PSS occasion) indicates to the UE to wake up, the UE may not switch the active BWP. If the PSS indicates to the UE not to wake up (or to go to sleep), the UE may increase a BWP switch counter by 1. Once the BWP switch counter reaches a threshold which preconfigured by the gNB, the UE may switch the active BWP to a specific BWP. The specific BWP may be a default BWP, an initial BWP, a narrow BWP, and/or a specific BWP for power saving. The specific BWP may be indicated by NW or specified in the 3GPP specification or be predefined. The BWP switch counter may be set to zero once the UE receives the PSS that indicates to the UE to wake up. The BWP switch counter may be set to zero once the UE receives a PDCCH for scheduling (e.g., for DL or UL (re)transmission).

In one implementation, if the PSS (e.g., monitored/received on the PSS occasion) indicates to the UE to wake up, the UE may switch the active BWP. If the PSS indicates to the UE not to wake up (or to go to sleep), the UE may not switch the active BWP to a specific BWP. The specific BWP may be a BWP for scheduling.

In one implementation, while the UE receives a PSS that indicates a BWP switch of a cell, the UE may assume it may wake up at all serving cells (e.g., including the PCell) in the upcoming DRX On-duration.

In one implementation, while the UE receives a PSS that indicates BWP switch of a specific cell, the UE may assume it may wake up at all serving cells belonging to the PTAG in the upcoming DRX On-duration.

Case #2: UE Behaviors for BWP Operations Via PSS

A PDCCH (e.g., a DCI for scheduling) may be received at any time in the DRX active time. If the UE receives a PDCCH for BWP switch, and the UE switches the active DL BWP to a BWP that is not a default BWP and/or an initial BWP, the UE may start or restart a timer (e.g., bwp-InactivityTimer) associated with the active DL BWP. However, the monitoring occasion of the PSS may be configured before each DRX On-duration, and therefore, there may be a time gap (or an offset) between the PSS reception and the DRX active time. During the time gap, the NW may not schedule the UE since the UE does not stay in the DRX active time for PDCCH monitoring. The method(s) of determining the time for the UE to start/restart the bwp-InactivityTimer (if the PSS is used to indicate BWP switch) are as follows.

Figure 3:
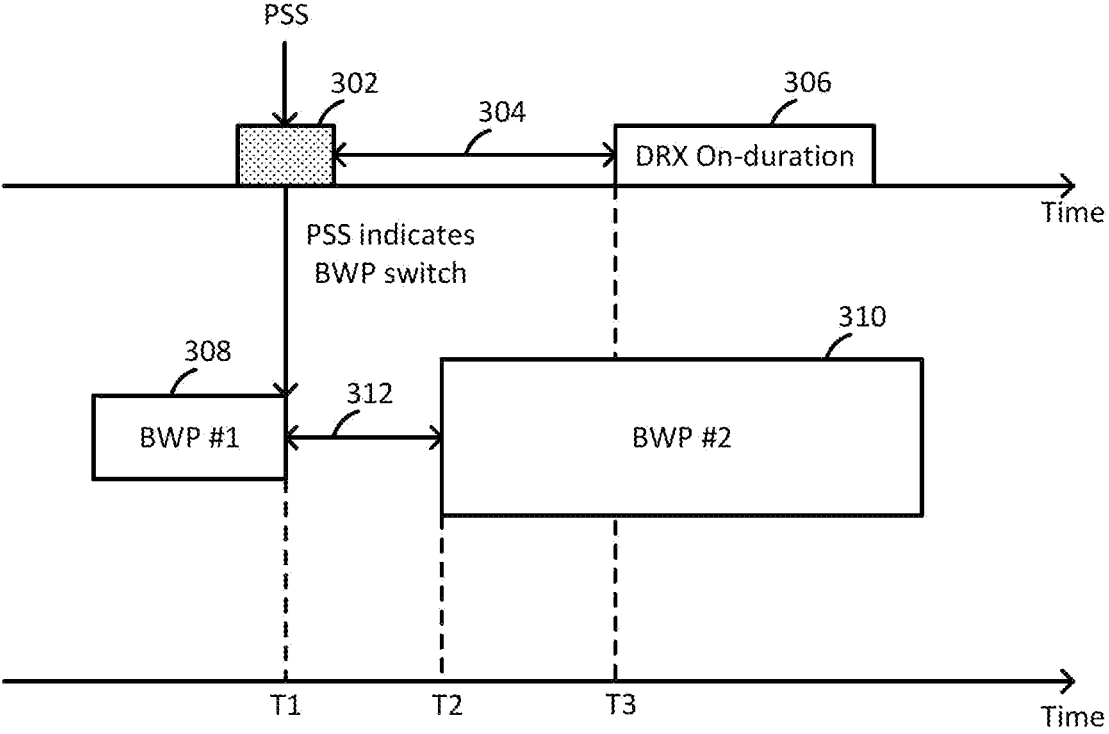
FIG. 3 illustrates the timing of starting or restarting the bwp-InactivityTimer, according to an implementation of the present disclosure.

FIG. 3 illustrates the timing of starting or restarting the bwp-InactivityTimer, in accordance with an implementation of the present disclosure. As illustrated in FIG. 3, the UE may start or restart the bwp-InactivityTimer when receiving a PSS (or PDCCH WUS). For example, the UE may start or restart the bwp-InactivityTimer at time T1.

In one implementation, the PSS may indicate to the UE to switch the BWP. Whether the PSS is used to indicate the UE to switch the BWP may be determined based on the implementations described above. If the PSS indicates to the UE to switch the BWP to a default/initial BWP, the UE may not start/restart the bwp-InactivityTimer, or may stop the bwp-InactivityTimer (if the bwp-InactivityTimer is running). The UE may start or restart the bwp-InactivityTimer at a symbol/slot/subframe in a PSS monitoring occasion (e.g., the PSS monitoring occasion 302) if the UE receives a PSS on the PSS monitoring occasion. If the PSS indicates to the UE to perform BWP switch on more than one serving cell, the UE may start or restart the bwp-InactivityTimer associated with the corresponding serving cells (e.g., if the BWP indicated by the PSS is not a default/initial BWP). An example of the corresponding UE operation is in Table 1.

TABLE 1

| Example |
| --- |
| 1> if a PDCCH or a PDCCH-WUS for BWP switch is received, and the MAC entity switches the active DL BWP: |
| 2> if the defaultDownlinkBWP-Id is configured, and the MAC entity switches to the DL BWP which is not indicated by the defaultDownlinkBWP-Id; or |
| 2> if the defaultDownlinkBWP-Id is not configured, and the MAC entity switches to the DL BWP which is not the initialDownlinkBWP: |
| 3> start or restart the bwp-InactivityTimer associated with the active DL BWP. |

In one implementation, the UE may start or restart the bwp-InactivityTimer when the active BWP has already been switched (e.g., switch from the BWP #1 308 to the BWP #2 310). After the UE receives the PSS for BWP switch at a DL slot on a serving cell, the UE may need some time (e.g., a time gap 312 for a BWP switch delay) to switch the BWP. In this situation, for example, the UE may start or restart the bwp-InactivityTimer at time T2.

In one implementation, if the UE receives a PSS that indicates to the UE to switch the BWP, the UE may start performing BWP switch, and the UE may start or restart the bwp-InactivityTimer when the UE is able to receive a PDSCH (for DL active BWP switch) or transmit a PUSCH (for UL active BWP switch) on the new BWP on the serving cell. Whether the PSS indicates to the UE to switch the BWP may be based on the implementations described above. If the PSS indicates to the UE to switch the BWP to a default/initial BWP, the UE may not start or restart the bwp-InactivityTimer. If the PSS indicates to the UE to switch the BWP to a default/initial BWP, the UE may stop the bwp-InactivityTimer. For example, if the PSS indicates to the UE to switch the active BWP on multiple serving cells, the UE starts or restarts the bwp-InactivityTimer associated with each corresponding serving cell based on when the active BWP of each serving cell has been switched. For example, time T2 may be assigned by a gNB via a PDCCH-WUS configuration. In another example, time T2 may be a default value. Besides, a common T2 value may be applied for all serving cells, or a cell-specific T2 value may be configured per a serving cell basis.

In one implementation, the UE may start or restart the bwp-InactivityTimer at the beginning of the DRX cycle or the DRX On-duration (e.g., the DRX On-duration 306) of the DRX cycle. For example, the UE may start or restart the bwp-InactivityTimer at time T3.

In one implementation, if the UE receives a PSS that indicates to the UE to switch the BWP, the UE may start performing the BWP switch, and the UE may start or restart the bwp-InactivityTimer at the starting symbol/slot/subframe of the first upcoming DRX cycle/On-duration. Whether the PSS indicates to the UE to switch the BWP may be based on the implementations described above. If the PSS indicates to the UE to switch the BWP to a default/initial BWP, the UE may not start or restart the bwp-InactivityTimer. If the PSS indicates to the UE to switch the BWP to a default/initial BWP, the UE may stop the bwp-InactivityTimer. For example, if the PSS indicates BWP switch on multiple serving cells, the UE may start or restart the bwp-InactivityTimer of each serving cell at the same time (e.g., if the staring symbols/slots/subframes of the DRX cycle/On-duration are the same for the serving cells).

In one implementation, the UE may start or restart the bwp-InactivityTimer after "n" symbol/slot/subframe(s) when the receives the PSS, where n is a natural integer, which may be configured by the NW or specified in the 3GPP specification. In one implementation, the value of "n" may refer to an offset (e.g., the offset 304) configured for a PSS monitoring occasion (e.g., the PSS monitoring occasion 302). The value of "n" may be configured in a PSS configuration.

Case #3: PSS Monitoring Occasion in DRX Active Time and Misdetection of PSS

A UE may monitor the PDCCH while the UE is in the DRX active time. There are several timers (e.g., drx-onduration timer, drx-InactivityTimer, etc.) and events (e.g., when SR is sent and is pending, etc.) specified in the 3GPP TS 38.321 V15.5.0 which would trigger the UE to wake up to monitor the PDCCH. In some situations, the DRX active time may cover and/or overlap with the PSS monitoring occasion(s) in the time domain. For example, UL data from the UE may arrive when the UE is not in the DRX active time. In this situation, the UE may trigger an SR procedure to transmit an SR to request an UL resource. Moreover, the UE may stay in the DRX active time when the SR is transmitted, and the SR procedure is pending. It is likely that the DRX active time may overlap with (e.g., partially and/or fully overlap with) the PSS monitoring occasion in the time domain. In another example, the drx-InactivityTimer may be started or restarted when the UE receives a PDCCH that indicates a new transmission. Consequently, it is also possible that the drx-InactivityTimer keeps running on the next PSS monitoring occasion(s). However, it may be redundant that the UE monitors the PSS during the DRX active time because the UE has already ramped up the power to monitor the PDCCH. Additionally, the UE-specific configuration of the search space sets(s) dedicated to the PSS monitoring may be used, which means the search space configured for the monitoring of PSS may be different from the search space configured for other DCI(s). Thus, monitoring the PSS in DRX active time may waste the UE's processing power due to additional blind decoding overhead, resulting in unnecessary constraints and degraded detection performance.

Figure 4:
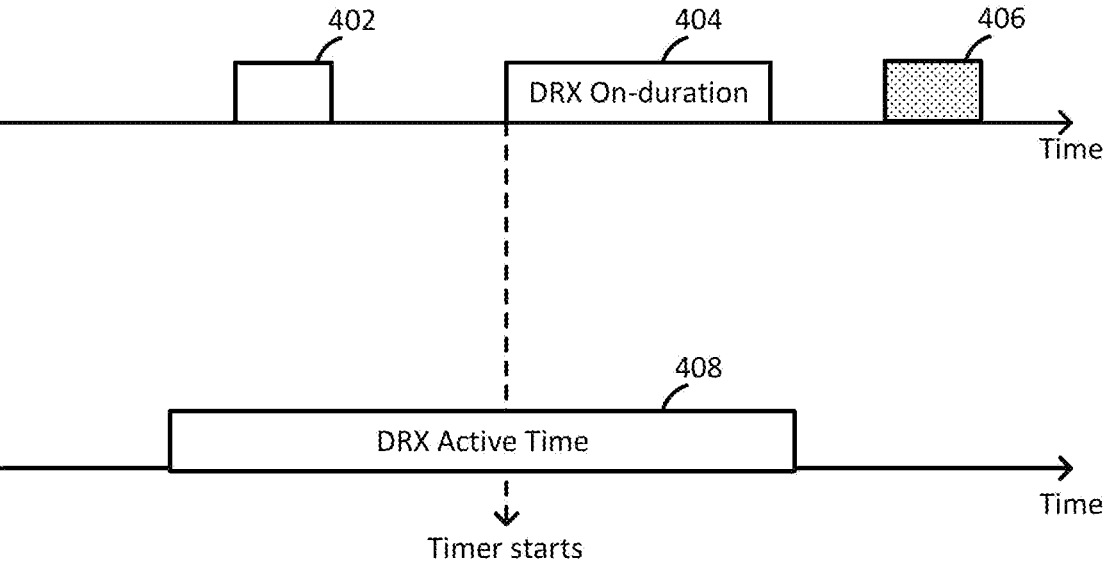
FIG. 4 illustrates an example of a process of a UE not monitoring a PSS in the Discontinuous Reception (DRX) active time, in accordance with an implementation of the present disclosure.

FIG. 4 illustrates an example of a process of a UE not monitoring a PSS in the DRX active time, in accordance with an implementation of the present disclosure. In the implementation illustrated in FIG. 4, the UE may not monitor a PSS monitoring occasion (e.g., the PSS monitoring occasion 402) while the UE is in the DRX active time (e.g., the DRX active time 408). Additionally, the UE may start a timer (e.g., drx-onDurationTimer) at the beginning of the subsequent DRX cycle (e.g., at the beginning of the DRX On-duration 404) if the UE does not monitor the PSS, the UE does not receive the PSS successfully, and/or the UE is in the DRX active time (e.g., the DRX active time 408) during a PSS monitoring occasion (e.g., the PSS monitoring occasion 402). The UE may monitor a PSS monitoring occasion (e.g., the PSS monitoring occasion 406) when the UE is not in the DRX active time.

It is noted that because the PSS may be used to indicate BWP switch, misalignments between the NW and the UE for the active BWP of the UE may occur if the UE does not monitor or detect or receive the PSS. For example, when the NW instructs the UE to switch from a first BWP to a second BWP via a PSS, the UE may not switch the current active BWP and still consider the first BWP as the active BWP because the UE does not monitor or detect or receive the PSS during the PSS monitoring occasion. In addition, in this situation, the NW may still perform scheduling on the second BWP since the NW may mistakenly consider that the active BWP of the UE has become the second BWP, causing the UE to be unable to receive scheduling information from the NW.

In addition, in some situations, the UE may mistakenly or unsuccessfully detect/receive a PSS on a PSS monitoring occasion. For example, if the NW transmits a PSS on a PSS monitoring occasion, although the UE monitors the PSS monitoring occasion, the UE may fail to receive the PSS on the PSS monitoring occasion (e.g., because the UE does not successfully decode the PSS). Furthermore, if the PSS is multipurpose (e.g., used to indicate BWP switch and wake up the UE at the same time), the failed detection/reception of the PSS may cause more issues. For example, when the NW instructs the UE to switch from a first BWP to a second BWP via a PSS, the UE may not follow the PSS to switch the current active BWP due to the failed detection/reception of the PSS and may still consider the first BWP as the active BWP. In addition, in this situation, the NW may still perform scheduling on the second BWP since the NW may mistakenly consider the active BWP of the UE has become the second BWP, causing the UE to be unable to receive scheduling information from the NW.

The present disclosure provides one or more implementations to address these issues.

In one implementation, the UE may not expect the NW to transmit a PSS during the DRX active time. The UE may not monitor the PSS (on the PSS monitoring occasion) during the DRX active time. For example, the NW may not use the PSS to switch the UE's active BWP during the DRX active time. The NW may only use other scheduling DCI instead of PSS(s) to switch the UE's active BWP during the DRX active time.

In one implementation, the UE may not transmit a specific message (e.g., including a confirmation message and/or feedback information) to the NW if the UE does not monitor (or does not receive) the PSS in the DRX active time. When the UE monitors and/or receives the PSS, the UE may need to transmit such a specific message to the NW. A confirmation message may be a MAC CE. For example, the gNB may grant the UL resources on an upcoming DRX On-duration if the gNB has transmitted the PSS to instruct the UE to perform the BWP switch. Otherwise, the UE may trigger an SR procedure(s) to transmit the confirmation message. On the other hand, feedback information (e.g., ACK/NACK) may be PHY signaling.

In one implementation, the specific message (e.g., including a confirmation message and/or feedback information) may be transmitted only when the UE tries to monitor the PSS. The content of the specific message may vary depending upon whether the UE successfully monitors the PSS. For example, the UE may transmit an ACK to the NW if the UE successfully receives the PSS on the PSS monitoring occasion. Conversely, the UE may transmit a NACK to the NW if the UE does not (successfully) receive the PSS on the PSS monitoring occasion.

In one implementation, the UE may start or restart a timer (e.g., bwp-InactivityTimer) when the UE transmits the specific message to NW.

For example, when the UE receives the PSS and the PSS indicates to the UE to perform a BWP switch, the UE may perform BWP switch and transmit the specific message to the NW. When the UE transmits the specific message to the NW, the UE may start or restart the bwp-InactivityTimer. For another example, when the UE receives the PSS and the PSS indicates to the UE not to perform the BWP switch, the UE may not perform the BWP switch but still transmit the specific message to NW. When the UE transmits the specific message to the NW, the UE may not start or restart the bwp-InactivityTimer.

In one implementation, the UE may transmit signaling to the NW if the UE does not monitor (and/or does not receive) the PSS (on the PSS monitoring occasion) in the DRX active time. The signaling may be used to inform the NW that the UE does not monitor the PSS monitoring occasion and/or the UE unsuccessfully receives the PSS.

In one implementation, the NW may transmit multiple PSSs (e.g., to perform PSS transmission repetitions) (on the PSS monitoring occasion) to a UE before a DRX On-duration (or a DRX cycle). More specifically, the PSSs may indicate the same information. For example, the NW may configure at least one of PSS monitoring occasions (on different time/frequency resources) before a DRX On-duration (or a DRX cycle). The UE may monitor at least one of the PSS monitoring occasions to decode the possible PSS. If the UE successfully receives/decodes a PSS on at least one of the PSS monitoring occasion(s) before the DRX On-duration, the UE may stop monitoring the other PSS monitoring occasion(s) before the DRX On-duration. If the UE does not receive (and/or decode successfully) a PSS on all the PSS monitoring occasion(s) before the DRX On-duration, the UE may consider the PSS is received unsuccessfully. The UE may, for example, transmit feedback to the NW to inform the NW of the unsuccessful reception of PSS.

Enhancements of PSS

In one implementation, a PSS (e.g., which is received outside the DRX active time) may be used to activate/deactivate an SCell(s). For example, the PSS may have a field to include the SCell information (e.g., SCell ID(s)). For example, the PSS may have a field to indicate SCell activation/deactivation. For example, the PSS may explicitly or implicitly indicate which SCell(s) should be activated or deactivated.

Provided that a first SCell of a UE is activated and a second SCell of the UE is deactivated, one or more of the following implementations/examples may be applied when the UE receives a PSS.

In one implementation, the PSS may not have a field to indicate SCell activation/deactivation. If the PSS includes the SCell ID of the first SCell, since the first SCell of the UE has already been activated before the UE receives the PSS, the UE may deactivate the first SCell when the UE receives the PSS. If the PSS includes the SCell ID of the second SCell ID, since the second SCell of the UE has already been deactivated before the UE receives the PSS, the UE may activate the second SCell when receives the PSS.

In one implementation, the PSS may not have a field to indicate SCell activation/deactivation. If the PSS includes the SCell ID of the first SCell, since the first SCell of the UE has already been activated before the UE receives the PSS, the UE may deactivate the first SCell when the UE receives the PSS. If the PSS includes the SCell ID of the second SCell ID, since the second SCell of the UE has already been deactivated before the UE receives the PSS, the UE may activate the second SCell when receives the PSS.

In one implementation, the PSS may include a field to indicate SCell activation/deactivation. If the PSS includes an SCell ID, the UE may activate or deactivate the SCell indicated by the SCell ID based on the field that indicates the SCell activation/deactivation.

In one implementation, whether to activate or deactivate may be based on the PSS indicating to the UE to wake up or not wake up. If the PSS indicates to the UE to wake up and includes an SCell ID, the UE may activate the SCell indicated by the SCell ID. If the PSS indicates to the UE not to wake up and includes an SCell ID, the UE may deactivate the SCell indicated by the SCell ID.

In one implementation, if the PSS does not have a field to indicate SCell activation/deactivation (and/or a field to indicate SCell information (e.g., an SCell ID)), or if the field to indicate SCell activation/deactivation (and/or the field to indicate SCell information) has a specific value, the UE may not perform the SCell activation/deactivation.

In one implementation, which SCell(s) to be activated/deactivated by the PSS may be pre-configured. If the UE receives a PSS that includes a field to indicate SCell activation, the UE may activate (one or more or group of or all of) the SCell(s) configured by the NW. If the UE receives a PSS that includes a field to indicate SCell deactivation, the UE may deactivate (one or more or group of or all of) the SCell(s) configured by the NW.

In one implementation, once the UE receives a PSS indicating SCell activation, the MAC entity of the UE may start or restart a timer (e.g., sCellDeactivationTimer) associated with the SCell at the time specified in the 3GPP TS 38.213.

In one implementation, a PSS may be used to trigger a dormant operation of an SCell(s). It is noted that, when a serving cell (e.g., an SCell) of a UE is in the dormancy state, it may mean that the UE is configured with (or performs) a dormant operation on the serving cell. Thus, the terms "dormancy state" and "dormant operation" may be interchangeably utilized in some implementations of the present disclosure.

The dormant operation for a serving cell (e.g., an SCell) may include performing CSI measurement(s) on the serving cell and stopping (or not performing) PDCCH monitoring on the serving cell. In some implementations, the dormant operation for a serving cell may further include performing AGC for the serving cell and performing beam management for the serving cell.

In one implementation, the PSS may have a field to include cell information (e.g., for one or more or group of cells). For example, the PSS may have a field to indicate the dormant operation for one or more or a group of cells. For example, the PSS may explicitly or implicitly indicate the cell(s) on which the UE is configured with (or performs) a dormant operation. The PSS may explicitly or implicitly indicate to the UE on which cell(s) the UE is configured with (or performs) the dormant operation.

Introducing a dormancy state (or dormant operation) for a serving cell may be a solution to fast return to SCell utilization for data transfer. As disclosed previously, the dormant operation for a serving cell may refer to a process that the UE may stop monitoring PDCCH but continue other activities such as CSI measurements, AGC, and beam management on the serving cell.

Provided that a first BWP of a first SCell of a UE is configured with the dormant operation and a second BWP of a second cell of the UE is not configured with the dormant operation, if the UE receives a PSS, one or more than one of the following implementations/examples may be applied.

In one implementation, the PSS may have a field to indicate/activate the dormant operation for one or more or a group of SCell(s). If the PSS includes cell information for one or more or a group of SCell(s), the UE may determine whether to perform/activate the dormant operation on the BWP of the one or more or group of SCell(s) based on the field.

In one implementation, whether the UE performs/activates the dormant operation on a BWP of one or more or a group of cells may be based on whether the PSS indicates to the UE to wake up. For example, if the PSS indicates to the UE to wake up and includes the SCell information of one or more or a group of SCells, the UE may not perform/activate the dormant operation on the BWP of the one or more or a group of SCells. If the PSS indicates to the UE not to wake up and includes the SCell information of one or more or a group of SCells, the UE may not perform/activate the dormant operation on the BWP of the one or more or a group of SCells.

In one implementation, if the PSS does not include a field indicating the dormant operation on a BWP of one or more or group of SCell(s) and/or a field indicating SCell information (e.g., SCell ID), the UE may not change the dormant operation on the BWP of the one or more or group of SCells.

In one implementation, a PSS may have a field that indicates only SCell information or SCell group information (e.g., by including an index for one or more or group of SCells) but may not have a field that indicates the dormant operation.

In one implementation, the UE should perform/activate dormant operation on the BWP, of which one or more or group of SCell(s) may be pre-configured. If the UE receives a PSS that includes a field indicating the dormant operation for a group of SCells, the UE may perform/activate dormant operation on(all) the SCell(s) in the group configured by the NW.

In one implementation, the UE may be configured with cross-carrier scheduling, and the PSS may be received in the scheduling cell. If the scheduling cell is instructed to activate dormant operation, all of the scheduled cells may be instructed to perform/activate dormant operation.

In one implementation, the UE may be configured with cross-carrier scheduling, and the PSS may be received in the scheduling cell. If the dormant operation is configured to a specific BWP (e.g., a dormant BWP), performing BWP switch to the specific BWP for the scheduling cell may imply that all the scheduled cell(s) may have a BWP switched to the specific BWP on which the UE is configured with the dormant operation.

In one implementation, the PSS may include information identifying the group(s) of serving cells (e.g., among RRC configured groups) on which the UE needs to perform/activate (or deactivate) the dormant operation. For example, a bitmap may be included in the PSS. Each bit within the bitmap may indicate a group (of serving cells). For example, a bit in the bitmap may be set to 1 to indicate that the UE needs to perform/activate the dormant operation on the (serving cells of the) corresponding group, which means the UE should perform the dormant operation on the active BWPs of the serving cell(s) in the group. Alternatively, the bit may be set to 0 to indicate that the UE needs to deactivate the dormant operation on the (serving cells of the) corresponding group such that the UE should not perform/activate dormant operation on the active BWPs of the serving cell(s) in the group. Moreover, the bits in the bitmap may be associated with the groups in an ascending order. For example, the first bit in the bitmap may be associated with a group with the largest group index (or a group containing a cell having the largest cell index in the same MAC entity) and the second bit in the bitmap may be associated with a group with second large group index, and so on.

In one implementation, the PSS may include information identifying the group(s) of serving cells, (e.g., among an RRC configured groups) on which the UE may monitor the PDCCH on the next occurrence of the drx-onDurationTimer (of that serving cells of the group).

In one implementation, the UE may determine whether to monitor a PDCCH of a serving cell (e.g., in a DRX On-duration) based on whether the UE needs to perform/activate the dormant operation on the serving cells. If the UE needs to perform/activate the dormant operation on the serving cell, the UE may not monitor a PDCCH of the serving cell (e.g., in a DRX On-duration). If the UE needs to deactivate the dormant operation on the serving cell, the UE may monitor the PDCCH of the serving cell (e.g., in a DRX On-duration).

In one implementation, the UE may determine whether to start or restart the drx-onDurationTimer of a serving cell (e.g., in a DRX On-duration) based on whether the UE needs to perform/activate the dormant operation on the serving cell. If the UE needs to perform/activate the dormant operation on the serving cells, the UE may not start or restart the drx-onDurationTimer of the serving cell (e.g., in a DRX On-duration). If the UE needs to perform/activate the dormant operation on the serving cell, the UE may start or restart the drx-onDurationTimer of the serving cell (e.g., in a DRX On-duration).

For example, the UE may determine whether to start or restart the drx-onDurationTimer of a serving cell (e.g., on DRX On-duration) based on whether the UE receives a PSS to change the dormant operation of the serving cell. If the PSS indicates to the UE to perform/activate dormant operation on the serving cell, the UE may not start or restart the drx-onDurationTimer of the serving cell (e.g., on DRX On-duration). If the PSS indicates to the UE not to perform/activate dormant operation on the serving cell, the UE may start or restart the drx-onDurationTimer of the serving cell (e.g., on DRX On-duration).

In one implementation, if a UE receives a PSS (e.g., on an SpCell) that indicates to the UE to wake up (on the next occurrence of the DRX On-duration) and indicates that the UE needs to perform/activate the dormant operation on a group (or a set) of serving cell(s), the UE may not monitor a PDCCH of the serving cell(s) in the group (on the next occurrence of the DRX On-duration), and the UE may monitor the PDCCH of the serving cell(s) that are not in the group (on the next occurrence of the DRX On-duration).

In one implementation, if a UE receives a PSS (e.g., on an SpCell) which indicates to the UE to wake up (on the next occurrence of the DRX On-duration) and indicates that the UE needs to perform/activate the dormant operation on a group (or a set) of serving cell(s), the UE may not start or restart the drx-onDurationTimer of the serving cell(s) in the group (on the next occurrence of the DRX On-duration), and the UE may start or restart the drx-onDurationTimer of the serving cell(s) which are not in the group (on the next occurrence of the DRX On-duration).

In one implementation, if a UE receives a PSS (e.g., on an SpCell) that indicates to the UE not to wake up (on the next occurrence of the DRX On-duration) and indicates that the UE needs to perform/activate the dormant operation on a group (or a set) of serving cell(s), the UE may not monitor a PDCCH of all the serving cell(s) in the group (on the next occurrence of the DRX On-duration), and the UE may monitor a PDCCH of the serving cell(s) that are not in the group (on the next occurrence of the DRX On-duration).

In one implementation, the dormant operation of (a BWP of) an SCell may be controlled by a timer.

For example, the timer may be started or restarted when the UE is instructed (e.g., via the PSS) to perform/activate the dormant operation for an SCell. While the timer is running, the UE may keep performing the dormant operation on (the BWP of) the SCell. When the timer expires, the UE may not perform/activate the dormant operation of (the BWP of) the SCell. The UE may stop the timer if the UE is instructed to not perform/activate (or to deactivate) the dormant operation of (the BWP of) the SCell.

On the other hand, since the PSS may be used to trigger the UE to wake up, the NW may schedule the UE on the upcoming DRX ON duration. However, the bwp-InactivityTimer and/or the sCellDeactivationTimer may expire before the DRX ON duration. In this situation, the UE may switch the current active BWP to the default/initial BWP and/or deactivate a SCell(s). Then the NW may not schedule the UE on the original BWP and/or the SCell. Therefore, the PSS may be used to extend the running time of the bwp-InactivityTimer and/or the sCellDeactivationTimer.

In one implementation, the UE may start or restart the bwp-InactivityTimer and/or the sCellDeactivationTimer when receiving the PSS. The specific timing to start or restart the bwp-InactivityTimer and/or the sCellDeactivationTimer may be the same as the time for BWP switch via PSS, as described above.

In one implementation, the UE may start or restart the bwp-InactivityTimer and/or the sCellDeactivationTimer when receiving the PSS, and the PSS indicates to the UE to wake up. The specific timing to start or restart the bwp-InactivityTimer and/or the sCellDeactivationTimer may be the same as the time for BWP switch via PSS, as described above.

In one implementation, if the UE receives the PSS without any BWP switch command, UE will start or restart the bwp-InactivityTimer and/or the sCellDeactivationTimer at a first time; On the contrary, if the UE receiving the PSS with a BWP switch command, UE may start or restart the bwp-InactivityTimer and/or the sCellDeactivationTimer at a second time. That is, the time to start the timer may depend on whether a BWP switch command is appended in the PSS.

In one implementation, a BWP switch may be controlled by one or more of the following methods (a) to (e):

(a) PDCCH Indicating a DL Assignment or an Uplink Grant

If the UE receives a PDCCH for the BWP switch of a serving cell, the UE may perform the BWP switch to a BWP indicated by the PDCCH (e.g., the PDCCH may include a BWP ID which is different from the current active BWP of the UE).

(b) bwp-InactivityTimer

If the bwp-InactivityTimer associated with the DL BWP expires, the UE may perform the BWP switch to a default BWP (if defaultDownlinkBWP-Id is configured) or an initial BWP (which is indicated by initialDownlinkBWP).

(c) RRC Signaling

Upon performing RRC (re-)configuration, a firstActive-DownlinkBWP IE contains the ID of the DL BWP to be activated. If this field is absent, the RRC (re-)configuration does not impose the BWP switch.

Upon performing RRC (re-)configuration, a firstActiveU-plinkBWP IE contains the ID of the UL BWP to be activated. If this field is absent, the RRC (re-)configuration does not impose the BWP switch.

(d) Upon Initiation of an RA Procedure

Upon initiation of the RA procedure on a serving cell, the UE may:

```
1> if PRACH occasions are not configured for the active UL BWP:
2>  switch the active UL BWP to BWP indicated by initialUplinkBWP;
2>  if the Serving Cell is a SpCell:
3>    switch the active DL BWP to BWP indicated by
      initialDownlinkBWP.
1> else:
2>  if the Serving Cell is a SpCell:
3>    if the active DL BWP does not have the same bwp-Id as the active
      UL BWP:
4>      switch the active DL BWP to the DL BWP with the same bwp-Id
        as the active
```

UL BWP.

(e) PSS

If the UE receives the PSS for BWP switch for a group of cells, the UE may switch the BWP of all the cells configured in the group. The PSS may indicate a BWP switch by including a bitmap. Each bit in the bitmap may be associated with a group of cells. The correspondence between the cell(s) and the group(s) may be configured by the NW (e.g., via RRC signaling).

When a DRX function is configured, the UE may not have to continuously monitor a PDCCH. In addition, the DRX function may be characterized by the following factors:

DRX On-duration: a time duration that the UE waits for, after waking up, to receive PDCCHs. If the UE successfully decodes a PDCCH, the UE stays awake and starts an inactivity timer;

DRX inactivity timer: used for determining a time duration that the UE waits to successfully decode a PDCCH, from the last successful decoding of a PDCCH and upon failing to successfully decode the PDCCH, the UE can go back to sleep. The UE may restart the inactivity timer following a single successful decoding of a PDCCH for a first transmission only (e.g., not for retransmissions);

retransmission timer: used for determining a time duration until a retransmission can be expected;

DRX cycle: used for determining a periodic repetition of the on-duration followed by a possible period of inactivity;

DRX active time: the total duration that the UE monitors a PDCCH. This may include the on-duration of a DRX cycle, the time the UE is performing continuous reception while the inactivity timer has not expired, and the time when the UE is performing a continuous reception while waiting for a retransmission opportunity.

Figure 5:
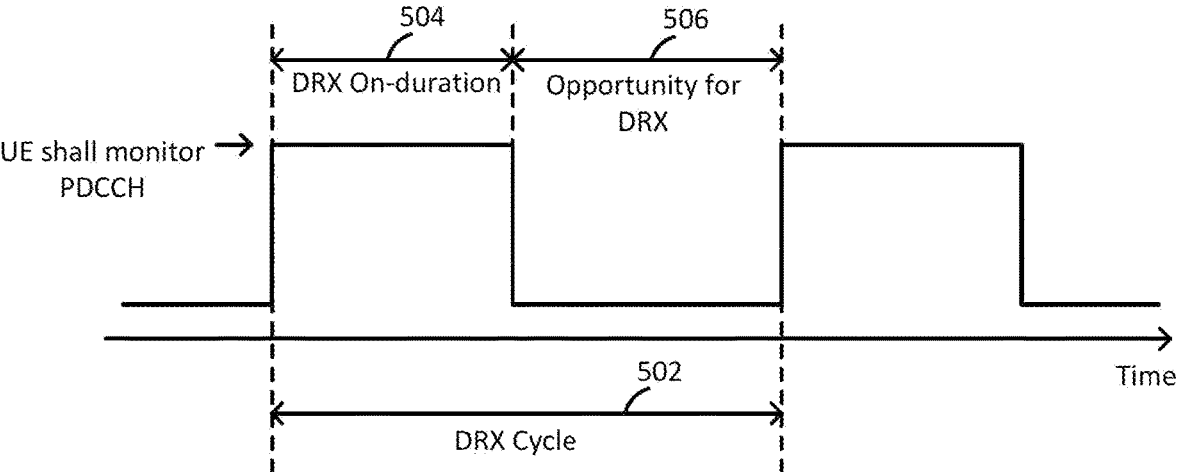
FIG. 5 is a diagram illustrating a DRX cycle in accordance with an implementation of the present disclosure.

FIG. 5 illustrates a DRX cycle according to an implementation of the present disclosure. As illustrated in FIG. 5, each DRX cycle 502 may include a DRX On-duration 504, during which the UE may perform PDCCH monitoring. The rest of the time period (e.g., time interval 506) in the DRX cycle may be considered as an opportunity for DRX.

When a DRX cycle is configured, the DRX active time may include the time during which—drx-onDurationTimer or drx-InactivityTimer or drx-RetransmissionTimerDL or drx-RetransmissionTimerUL or ra-ContentionResolution-Timer is running; or an SI is transmitted on a PUCCH, and the corresponding SI procedure is pending; or a PDCCH indicating a new transmission addressed to the C-RNTI of the MAC entity has not been received after successful reception of an RA Response for the RA Preamble not selected by the MAC entity among the contention-based RA Preamble.

The MAC entity may not monitor the PDCCH if the PDCCH is not a complete PDCCH occasion (e.g., the DRX active time starts or ends in the middle of the PDCCH occasion).

Various types of time delay are provided as follows.

Active BWP Switch Delay

The requirements of Active BWP switch delay apply for a UE configured with more than one BWP on PCell or any activated SCell in standalone NR or NE-DC, PCell, PSCell, or any activated SCell in MCG or SCG in NR-DC, or PSCell or any activated SCell in SCG in EN-DC. The UE may complete the switch of active DL and/or UL BWP within the delay specified in this section.

DCI and Timer-Based BWP Switch Delay

For DCI-based BWP switch, after the UE receives a BWP switch request at DL slot n on a serving cell, the UE may be able to receive PDSCH (for DL active BWP switch) or transmit PUSCH (for UL active BWP switch) on the new BWP on the serving cell on which BWP switch on the first DL or UL slot occurs right after the beginning of DL slot $n+T_{BWPswitchDelay}$.

The UE is not required to transmit UL signals or receive DL signals during time duration $T_{BWPswitchDelay}$ on the cell where DCI-based BWP switch occurs. The UE is not required to follow the requirements specified in this section when performing a DCI-based BWP switch between the BWPs in disjoint channel bandwidths or in partially overlapping channel bandwidths.

For timer-based BWP switch, the UE may start BWP switch at DL slot n, where n is the beginning of a DL subframe (FR1) or DL half-subframe (FR2) immediately after a BWP-inactivity timer bwp-InactivityTimer expires on a serving cell, and the UE may be able to receive PDSCH (for DL active BWP switch) or transmit PUSCH (for UL active BWP switch) on the new BWP on the serving cell on which BWP switch on the first DL or UL slot occurs right after the beginning of DL slot $n+T_{BWPswitchDelay}$.

The UE is not required to transmit UL signals or receive DL signals after bwp-InactivityTimer expires on the cell where a timer-based BWP switch occurs.

Depending on UE capability bwp-SwitchingDelay, UE may finish the BWP switch within the time duration $T_{BWPswitchDelay}$ specified in Table 2.

TABLE 2

| | | BWP switch delay | |
| | | | |
| NR Slot length | | BWP switch delay $T_{BWPswitchDelay}$ (slots) | |
| $\mu$ | (ms) | Type $1^{Note\ 1}$ | Type $2^{Note\ 1}$ |
| 0 | 1 | 1 | 3 |
| 1 | 0.5 | 2 | 5 |
| 2 | 0.25 | 3 | 9 |
| 3 | 0.125 | 6 | 18 |

*Note 1*

Depends on UE capability.

Note 2:

If the BWP switch involves changing of SCS, the BWP switch delay is determined by the larger one between the SCS before the BWP switch and the SCS after the BWP switch.

RRC Based BWP Switch Delay

For RRC-based BWP switch, after the UE receives BWP switch request, UE may be able to receive PDSCH/PDCCH (for DL active BWP switch) or transmit PUSCH (for UL active BWP switch) on the new BWP on the serving cell on which BWP switch occurs on the first DL or UL slot right after the beginning of DL slot n+

$$\frac{T_{RRCprocessingDelay} + T_{BWPswitchDelayRRC}}{NR\ Slot\ length},$$

where

DL slot n is the last slot containing the RRC command, and $T_{RRCprocessingDelay}$ is the length of the RRC procedure delay in milliseconds as specified in the 3GPP TS 38.321 V15.5.0, and $T_{BWPswitchDelayRRC}=[6]$ ms is the time used by the UE to perform the BWP switch.

The UE is not required to transmit UL signals or receive DL signals during the time specified by $T_{RRCprocessingDelay}+T_{BWPswitchDelayRRC}$ on the cell where the RRC-based BWP switch occurs.

Figure 6:
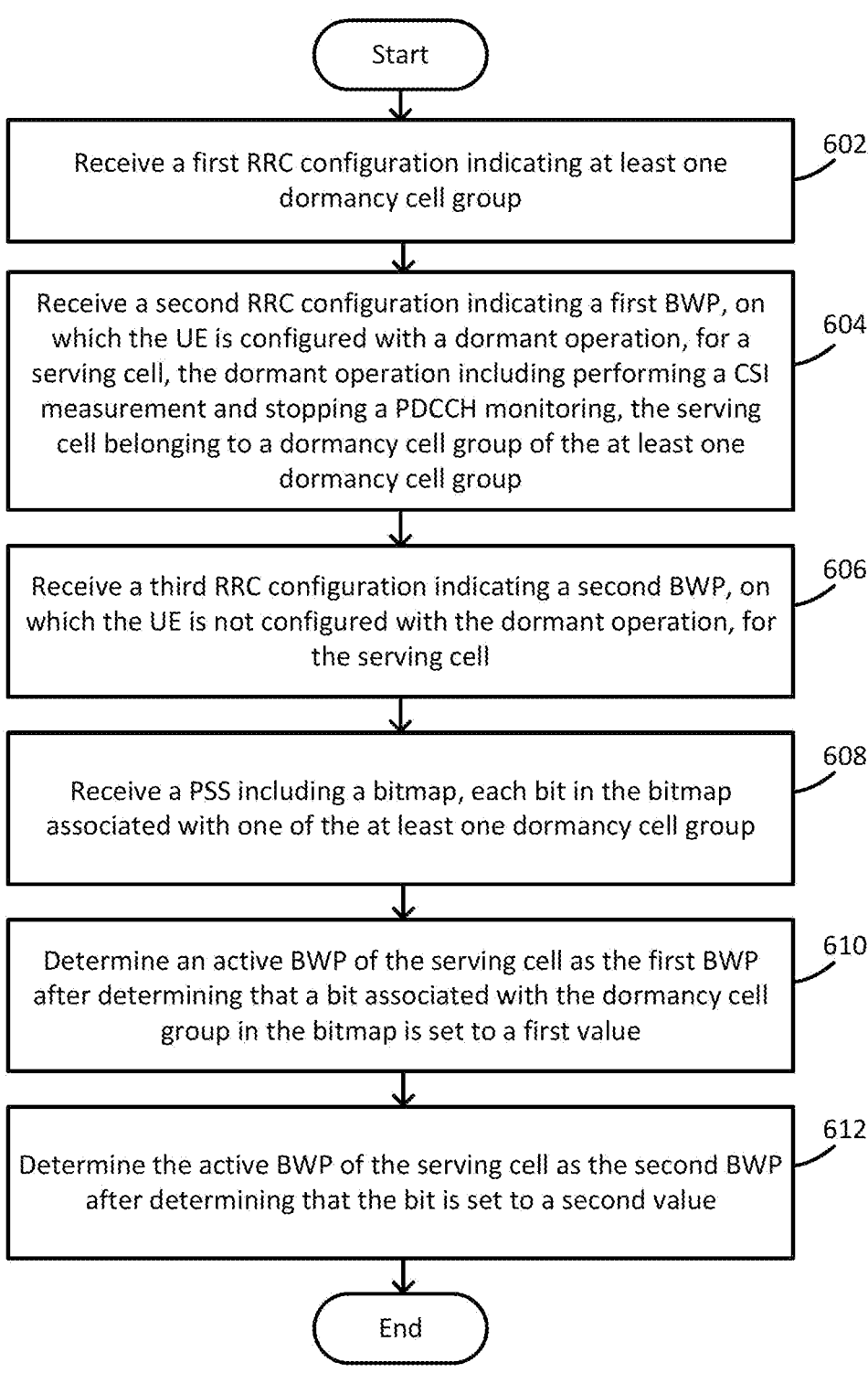
FIG. 6 illustrates a flowchart for a method performed by a UE for power saving operations, in accordance with an implementation of the present disclosure.

FIG. 6 illustrates a flowchart for a method performed by a UE for power saving operations, in accordance with an implementation of the present disclosure. It should be noted that although actions 602, 604, 606, 608, 610, and 612 are delineated as separate actions represented as independent blocks in FIG. 6, these separately delineated actions should not be construed as necessarily order dependent. The order in which the actions are performed in FIG. 6 is not intended to be construed as a limitation, and any number of the described blocks may be combined in any order to implement the method, or an alternate method. Moreover, one or more of the actions 602, 604, 606, 608, 610, and 612 may be omitted in some of the present disclosure.

In action 602, the UE may receive a first RRC configuration indicating at least one dormancy cell group.

In action 604, the UE may receive a second RRC configuration indicating a first BWP, on which the UE is configured with a dormant operation, for a serving cell. The dormant operation may include (the UE) performing a CSI measurement and stopping a PDCCH monitoring. In addition, the serving cell may belong to a dormancy cell group of the at least one dormancy cell group.

In one implementation, the dormant operation for the serving cell may further include at least one of (the UE) performing AGC for the serving cell, and (the UE) performing beam management for the serving cell.

In action 606, the UE may receive a third RRC configuration indicating a second BWP, on which the UE is not configured with the dormant operation, for the serving cell.

In action 608, the UE may receive a PSS including a bitmap, each bit in the bitmap associated with one of the at least one dormancy cell group.

In one implementation, the PSS may be received by the UE, on a PCell or an SpCell, via DCI that is scrambled by a PS-RNTI.

In one implementation, the PSS may include a wake-up indicator (e.g., WUS) for starting a DRX On-duration timer (drx-onDurationTimer) at a beginning of a DRX cycle.

In one implementation, the PSS may be received by the UE only on an SpCell. That is, the PSS may not be received on an SCell.

In one implementation, the UE may be configured with a DRX operation.

In one implementation, the UE may stop monitoring the PSS on a PDCCH monitoring occasion when the UE is in a DRX active time, where the PDCCH monitoring occasion may be configured for the PSS. The UE may monitor the PSS on the PDCCH monitoring occasion when the UE is not in DRX active time. As illustrated in FIG. 4, the UE may stop monitoring the PSS on the PDCCH monitoring occasion 402 when the UE is in the DRX active time 408, and start monitoring the PSS on another PDCCH monitoring occasion 406 when the UE is not in the DRX active time 408.

In action 610, the UE may determine an active BWP of the serving cell as the first BWP after determining that a bit associated with the dormancy cell group in the bitmap is set to a first value.

In action 612, the UE may determine the active BWP of the serving cell as the second BWP after determining that the bit is set to a second value.

In one implementation, there may be other serving cells belonging to the dormancy cell group such that the dormancy group may include more than one serving cell. In this situation, the UE may switch the active BWPs of all of the serving cells belonging to the same dormancy cell group based on the bit.

In one implementation, the active BWP may be a DL BWP.

Figure 7:
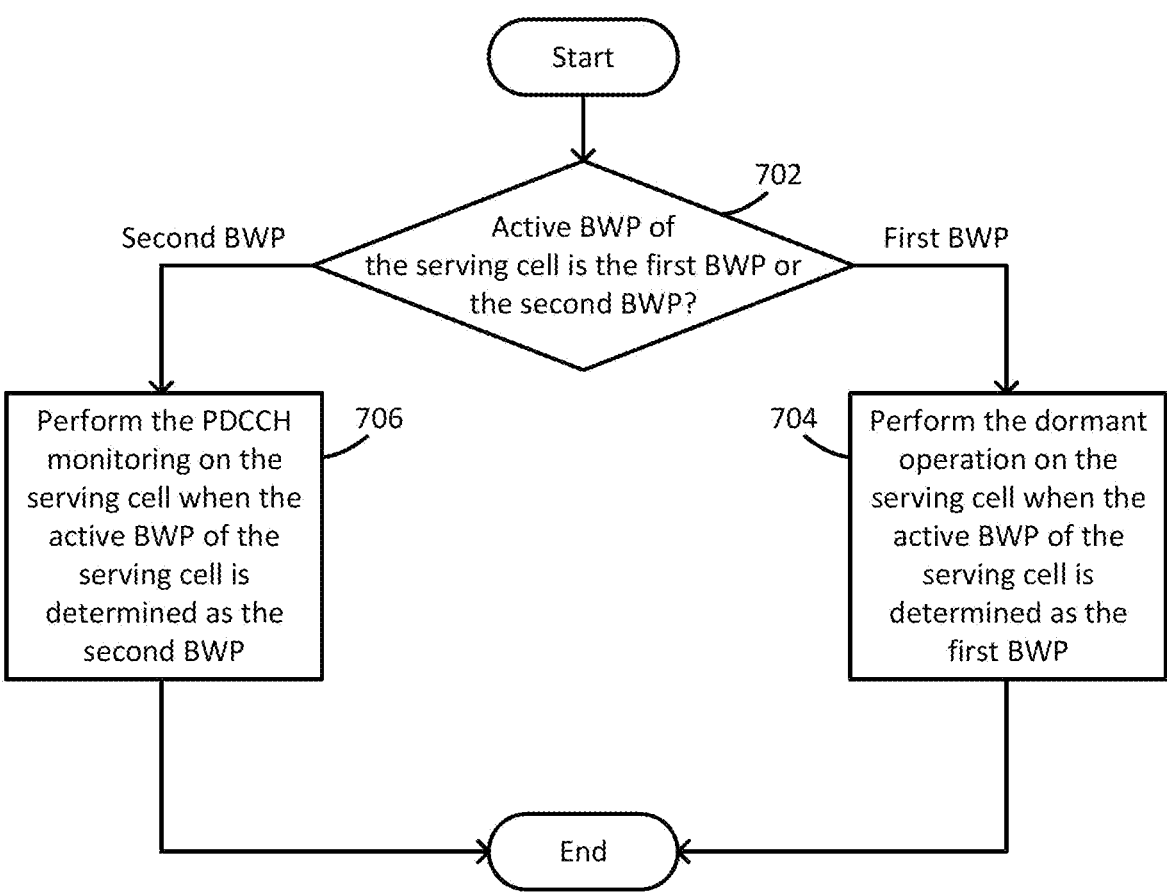
FIG. 7 illustrates a flowchart for another method performed by a UE for power saving operations, in accordance with an implementation of the present disclosure.

FIG. 7 illustrates a flowchart for another method performed by a UE for power saving operations, in accordance with an implementation of the present disclosure. The method illustrated in FIG. 7 may be performed in (or after) actions 610 and 612 illustrated in FIG. 6.

As illustrated in FIG. 7, in action 702, the UE may determine whether the active BWP of the serving cell is the first BWP or the second BWP.

In action 704, when the active BWP of the serving cell is determined as the first BWP, the UE may perform the dormant operation on the serving cell, and/or stop PDCCH monitoring on the serving cell in a case that the active BWP of the serving cell is determined as the first BWP.

In action 706, when the active BWP of the serving cell is determined as the second BWP, the UE may perform the PDCCH monitoring on the serving cell.

Figure 8:
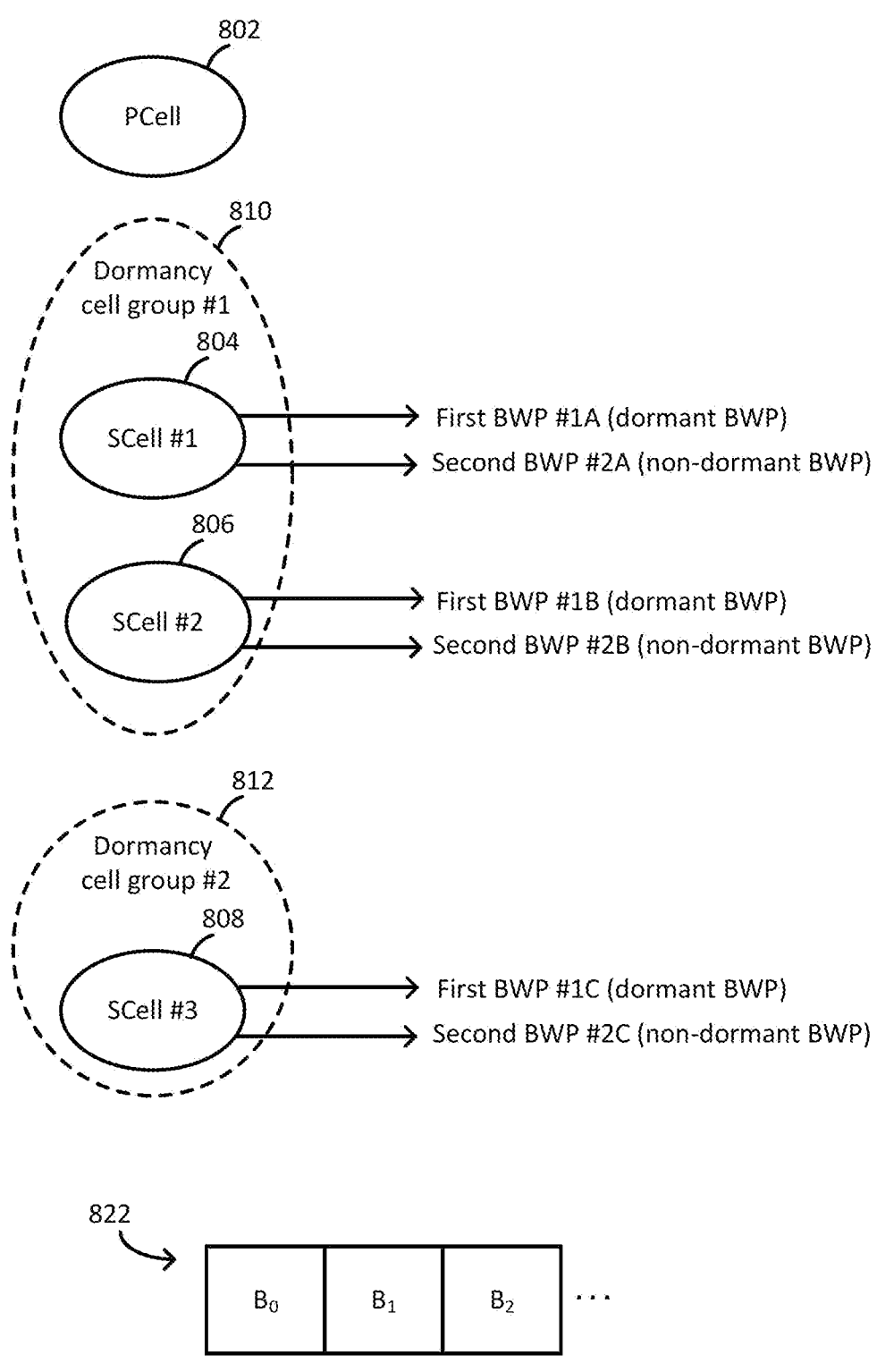
FIG. 8 illustrates an example of a process of controlling the dormant operation of each dormancy cell group through a PSS, in accordance with an implementation of the present disclosure.

FIG. 8 illustrates a process of controlling the dormant operation of each dormancy cell group through a PSS according to an implementation of the present disclosure.

As illustrated in FIG. 8, the serving cells of a UE may include a PCell 802, an SCell #1 804, an SCell #2 806, and an SCell #3 808. In addition, the UE may receive a first RRC configuration indicating that SCell #1 804 and SCell #2 806 belong to the dormancy cell group #1 810, and SCell #3 808 belongs to the dormancy cell group #2 812.

The UE may also receive a second RRC configuration indicating a first BWP (which is a dormant BWP) for an SCell of the UE. As illustrated in FIG. 8, the UE may receive a second RRC configuration indicating a first BWP #1A (which is a dormant BWP) for the SCell #1 804. The UE may receive a second RRC configuration indicating a first BWP #1B (which is a dormant BWP) for the SCell #2 806. The UE may receive a second RRC configuration indicating a first BWP #1C (which is a dormant BWP) for the SCell #3 808.

The UE may also receive a third RRC configuration indicating a second BWP (which is not a dormant BWP) for an SCell of the UE. As illustrated in FIG. 8, the UE may receive a third RRC configuration indicating a second BWP #2A (which is not a dormant BWP) for the SCell #1 804. The UE may receive a third RRC configuration indicating a second BWP #2B (which is not a dormant BWP) for the SCell #2 806. The UE may receive a third RRC configuration indicating a second BWP #2C (which is not a dormant BWP) for the SCell #3 808.

When an SCell (or the dormancy cell group to which the SCell belongs) is indicated as a cell on which the UE needs to perform/activate dormant operation, the first BWP configured for the SCell may be activated as the active BWP, on which the dormant operation may be performed. For example, when the SCell #1 804 is indicated as a cell on which the UE needs to perform the dormant operation, the first BWP #1A may be activated as the active BWP of the SCell #1 804. When the dormancy cell group #1 810 is indicated as a dormancy cell group on which the UE needs to perform the dormant operation, the first BWP #1A may be activated as the active BWP of the SCell #1 804 and the first BWP #1B may be activated as the active BWP of the SCell #2 806. On the first BWP #1A and/or the first BWP #1B, the UE may perform the dormant operation (e.g., performing CSI measurements but no PDCCH monitoring). Similarly, when the SCell #3 808 (or the dormancy cell group #2 812 including the SCell #3 808) is indicated as an SCell (or dormancy cell group) on which the UE needs to perform the dormant operation, the first BWP #1C may be activated as the active BWP of the SCell #3 808. The UE may perform the dormant operation on the first BWP #1C.

When an SCell (or the dormancy cell group to which the SCell belongs) is indicated as a cell on which the UE does not need to perform the dormant operation, the second BWP configured for the SCell may be activated as the active BWP, on which the dormant operation may not be performed. When the SCell #1 804 is indicated as a cell on which the UE does not need to perform the dormant operation, the second BWP #2A may be activated as the active BWP of the SCell #1 804. When the dormancy cell group #1 810 is indicated as a dormancy cell group that the UE does not need to perform the dormant operation, the second BWP #2A may be activated as the active BWP of the SCell #1 804 and the second BWP #2B may be activated as the active BWP of the SCell #2 806. On the second BWP #2A, the UE may not perform the dormant operation. For example, the UE may perform PDCCH monitoring on the second BWP #2A. Similarly, when the SCell #3 808 (or the dormancy cell group #2 812 including the SCell #3 808) is indicated as a cell (or dormancy cell group) that UE does not need to perform the dormant operation, the second BWP #2C may be activated as the active BWP of the SCell #3 808.

In one implementation, the dormant operation of a dormancy cell group may be controlled by a PSS. As illustrated in FIG. 8, the PSS 822 may include a wake-up indicator $B_0$ and a bitmap including several bits (e.g., a bit $B_1$ and a bit $B_2$, etc.). Each bit in the bitmap may correspond to a dormancy cell group. For example, the bit $B_1$ may correspond to the dormancy cell group #1 810, and the bit $B_2$ may correspond to the dormancy cell group #2 812. Each bit in the bitmap may be set to a first value (e.g., 1) to indicate that the UE needs to perform/activate the dormant operation on the serving cell(s) in the corresponding dormancy cell group (e.g., to instruct the UE to activate the dormant BWP (e.g., the first BWPs #1A, 1B, and 1C in FIG. 8) for the serving cell(s) in the corresponding dormancy cell group), or set to a second value (e.g., 0) to indicate that the UE need not perform the dormant operation (or needs to deactivate the dormant operation) on the serving cell(s) in the corresponding dormancy cell group (e.g., to instruct the UE to activate the non-dormant BWP (e.g., the second BWPs #2A, 2B, and 2C in FIG. 8) for the serving cell(s) in the corresponding dormancy cell group).

For example, when the bit $B_1$ is set to the first value, the UE may perform the dormant operation on all SCell(s) in the corresponding dormancy cell group #1 810. In this situation, the UE may determine that the first BWP #1A and the first BWP #1B are active BWPs on the SCell #1 804 and the SCell #2 806, respectively. On the other hand, when the bit $B_1$ is set to the second value, the UE may not perform the dormant operation on all SCell(s) in the corresponding dormancy cell group #1 810. In this situation, the UE may determine that the second BWP #2A and the second BWP #2B are active BWPs on the SCell #1 804 and the SCell #2 806, respectively.

It is noted that the first BWPs (e.g., the first BWP #1A, the first BWP #1B, and the first BWP #1C) indicated by the second RRC configuration may have the same BWP index or have different BWP indexes from each other. The second BWPs (e.g., the second BWP #2A, the second BWP #2B, and the second BWP #2C) indicated by the third RRC configuration may have the same BWP index or have different BWP indexes from each other.

The following disclosure may be used to further elaborate the term, example, embodiment, action, and/or operation mentioned above:

UE: The UE may be referred to as a PHY/MAC/RLC/PDCP/SDAP entity. The PHY/MAC/RLC/PDCP/SDAP entity may be referred to the UE.

NW: The NW may be an NW node, a TRP, a cell (e.g., SpCell, PCell, PSCell, and/or SCell), an eNB, a gNB, and/or a base station.

PDCCH occasion: A time duration (e.g., one or a consecutive number of slots/symbols/subframes) during which the MAC entity is configured to monitor the PDCCH.

PSS monitoring occasion: The monitoring occasion(s) of the PSS outside the active time is "indicated" to the UE by the gNB with an offset before or at the DRX ON.

Serving Cell: A PCell, a PSCell, or an SCell. The serving cell may be an activated or a deactivated serving cell.

SpCell: For Dual Connectivity operation, the term Special Cell refers to the PCell of the MCG or the PSCell of the SCG depending upon if the MAC entity is associated to the MCG or the SCG, respectively. Otherwise, the term Special Cell refers to the PCell. A Special Cell supports PUCCH transmission and contention-based RA, and is always activated.

PSS: The PSS may refer to a WUS, PDCCH-WUS, PDCCH-skipping, and/or go-to-sleep signaling. The PSS may be scrambled by a specific RNTI (e.g., PS-RNTI). The PSS may include one or more than one of the following information: Power saving technique associated with C-DRX (e.g., wake up and/or to go to sleep), cross-slot scheduling, triggering RS transmission, CSI report, single/multi-cell operation, BWP information (e.g., BWP ID), SCell information (e.g., SCell ID), MIMO layer adaptation (e.g., the maximum number of MIMO layer), the number of antennas, an indication of CORESET/search space/candidate of subsequent PDCCH decoding, PDCCH monitoring periodicity, PDCCH skipping, skipping a number of DRX monitoring occasions, SPS activation, DRX configuration, DRX cycle, etc. The monitoring occasion of PSS may be "indicated" to the UE by the NW with an offset before and or at the beginning (e.g., start symbol/slot/subframe) of DRX ON duration. The "indicated" may imply the explicit signaling by higher layer signaling or implicit through the CORESET/search space. For example, the NW may configure an offset to the UE. The NW may configure a specific CORESET and/or search space for PSS. The NW may configure a specific period for PSS, e.g., the period may be associated with the period of the DRX cycle. The UE may monitor the PSS on the offset before and or at the beginning (e.g., start symbol/slot/subframe) of DRX ON duration on the specific CORESET and/or search space.

WUS: The WUS may have a field to indicate the UE needs to wake up or not wake up. Alternatively, the WUS may not have a field to indicate the UE needs to wake up or not wakeup. When the UE receives the WUS (e.g., on a WUS/PSS monitoring occasion) may imply the NW indicates to the UE to wake up (e.g., to monitor the PDCCH on the following DRX On-duration (e.g., to start the drx-onDurationTimer at the beginning of the subsequent DRX cycle)). When the UE does not receive the WUS on a PSS monitoring occasion, it may imply the NW indicates to the UE to not wake up (e.g., not to monitor the PDCCH on the following DRX On-duration (e.g., not to start the drx-onDurationTimer at the beginning of the subsequent DRX cycle).

BWP switch: When the UE receives signaling (e.g., PSS), and the signaling includes BWP information. If the BWP information is different from the active (DL) BWP of the UE, the UE may perform a BWP switch to the BWP indicated by the signaling. If the BWP information is the same as the active (DL) BWP of the UE, the UE may not perform the BWP switch.

bwp-InactivityTimer: The UE may determine to start or restart the bwp-InactivityTimer of a cell-based on whether the UE performs BWP switch of the cell. If the UE performs a BWP switch of a cell, the UE may start or restart the bwp-InactivityTimer of the cell. If the UE does not perform a BWP switch of a cell, the UE may not start or restart the bwp-InactivityTimer of the cell. The duration of bwp-InactivityTimer is in ms, after which the UE falls back to the default Bandwidth Part. The value 0.5 ms is only applicable for carriers >6 GHz. When the NW releases the timer configuration, the UE stops the bwp-InactivityTimer without switching to the default BWP.

The serving cell(s), on which the UE may perform a BWP switch, may be activated. The serving cell(s), on which UE may perform a BWP switch, may be an activated serving cell(s). The UE may only switch BWP on the activated serving cell(s). The UE may not switch the BWP on the deactivated serving cell(s).

More specifically, the serving cell(s) may be configured for PSS. If a serving cell(s) is not configured for PSS, the UE may not switch the BWP of that serving cell(s), e.g., even if the UE receives a PSS on another serving cell (e.g., SpCell).

If a UE is configured with CrossCarrierSchedulingConfig and indicates support of search space sharing through searchSpaceSharingCA-UL or through searchSpaceSharingCA-DL, then an indication for BWP switch may apply to the serving cells sharing the same search space. On the other hand, if the indication(s) for the BWP switch is received through the specific search space, the targeted BWP ID may be shared as well.

It is noted that the BWP mentioned within the present disclosure may be a DL BWP or a UL BWP. In one example, once the UE is indicated with either a DL/UL BWP switch for a serving cell, the UE should also switch the active UL/DL BWP of the serving cell to the UL/DL BWP that has the same BWP ID as that of the DL/UL BWP indicated by the BWP switch (e.g., PSS).

Figure 9:
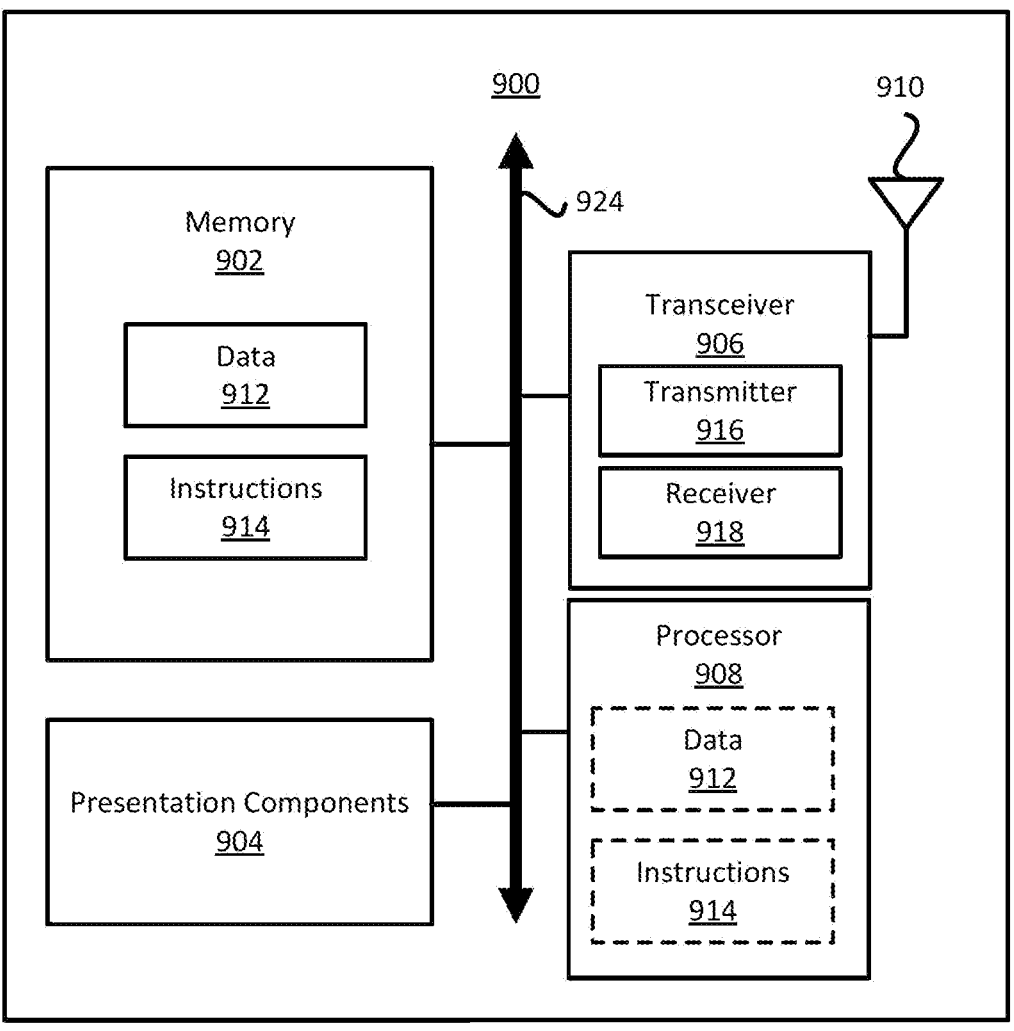
FIG. 9 illustrates a block diagram of a node for wireless communication, in accordance with various aspects of the present disclosure.

FIG. 9 illustrates a block diagram of a node 900 for wireless communication, in accordance with various aspects of the present disclosure. As illustrated in FIG. 9, the node 900 may include a transceiver 906, a processor 908, a memory 902, one or more presentation components 904, and at least one antenna 910. The node 900 may also include an RF spectrum band module, a BS communications module, a network communications module, and a system communications management module, Input/Output (I/O) ports, I/O components, and a power supply (not explicitly illustrated in FIG. 9). Each of these components may be in communication with each other, directly or indirectly, over one or more buses 924. In one implementation, the node 900 may be a UE or a BS that performs various functions described herein, for example, with reference to FIGS. 1 through 8.

The transceiver 906 having a transmitter 916 (e.g., transmitting/transmission circuitry) and a receiver 918 (e.g., receiving/reception circuitry) may be configured to transmit and/or receive time and/or frequency resource partitioning information. In one implementation, the transceiver 906 may be configured to transmit in different types of subframes and slots, including, but not limited to, usable, non-usable and flexibly usable subframes and slot formats. The transceiver 906 may be configured to receive data and control channels.

The node 900 may include a variety of computer-readable media. Computer-readable media can be any available media that can be accessed by the node 900 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information such as computer-readable instructions, data structures, program modules or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. Combinations of any of the above should also be included within the scope of computer-readable media.

The memory 902 may include computer storage media in the form of volatile and/or non-volatile memory. The memory 902 may be removable, non-removable, or a combination thereof. For example, the memory 902 may include solid-state memory, hard drives, optical-disc drives, etc. As illustrated in FIG. 9, the memory 902 may store computer-readable and/or computer-executable instructions 914 (e.g., software codes) that are configured to, when executed, cause the processor 908 to perform various functions described herein, for example, with reference to FIGS. 1 through 8. Alternatively, the instructions 914 may not be directly executable by the processor 908 but may be configured to cause the node 900 (e.g., when compiled and executed) to perform various functions described herein.

The processor 908 (e.g., having processing circuitry) may include an intelligent hardware device, a Central Processing Unit (CPU), a microcontroller, an ASIC, etc. The processor 908 may include memory. The processor 908 may process the data 912 and the instructions 914 received from memory 902, and information through the transceiver 906, the baseband communications module, and/or the network communications module. The processor 908 may also process information to be sent to the transceiver 906 for transmission through the antenna 910, to the network communications module for transmission to a CN.

One or more presentation components 904 may present data indications to a person or other devices. Examples of presentation components 904 may include a display device, speaker, printing component, vibrating component, etc.

From the present disclosure, it is manifested that various techniques may be used for implementing the disclosed concepts without departing from the scope of those concepts. Moreover, while the concepts have been disclosed with specific reference to specific implementations, a person of ordinary skill in the art would recognize that changes may be made in form and detail without departing from the scope of those concepts. As such, the described implementations are to be considered in all respects as illustrative and not restrictive. It should also be understood that the present disclosure is not limited to the specific disclosed implementations. Still, many rearrangements, modifications, and substitutions are possible without departing from the scope of the present disclosure.

What is claimed is:

1. A method for a User Equipment (UE) for performing a dormant operation, the method comprising:

receiving, from a Base Station (BS), a Radio Resource Control (RRC) configuration indicating a set of one or more dormancy cell groups, wherein a group of serving cells belongs to a specific dormancy cell group in the set of one or more dormancy cell groups;

receiving, from the BS, a signal including a bitmap when the UE is not in a Discontinuous Reception (DRX) active time; and switching, based on a bit in the bitmap that is associated with the specific dormancy cell group, active Bandwidth Parts (BWPs) of all activated serving cells included in the group of serving cells to a dormant BWP or to a non-dormant BWP.

2. The method of claim 1, further comprising:

performing the dormant operation on a specific serving cell included in the group of serving cells in a case that the active BWP of the specific serving cell is the dormant BWP.

3. The method of claim 1, wherein the dormant operation includes:

performing a Channel State Information (CSI) measurement; and forgoing monitoring a Physical Downlink Control Channel (PDCCH).

4. The method of claim 1, wherein the dormant operation includes at least one of:

performing Automatic Gain Control (AGC) for a specific serving cell included in the group of serving cells, or performing beam management for the specific serving cell.

5. The method of claim 1, further comprising:

forgoing monitoring a Physical Downlink Control Channel (PDCCH) on a specific serving cell included in the group of serving cells in a case that the active BWP of the specific serving cell is the dormant BWP; and monitoring the PDCCH on the specific serving cell in a case that the active BWP of the specific serving cell is the non-dormant BWP.

6. The method of claim 1, wherein receiving the signal comprises receiving the signal via Downlink Control Information (DCI) that is scrambled by a Power Saving-Radio Network Temporary Identifier (PS-RNTI).

7. The method of claim 1, wherein the signal further includes a wake-up indicator for starting a DRX On-duration timer (drx-onDurationTimer) at a beginning of a DRX cycle.

8. The method of claim 1, further comprising:

receiving a configuration of a DRX operation from the BS.

9. The method of claim 1, further comprising:

forgoing monitoring the signal on a Physical Downlink Control Channel (PDCCH) monitoring occasion when the UE is in the DRX active time, wherein the PDCCH monitoring occasion is configured for the signal.

10. The method of claim 1, wherein the active BWP of a specific serving cell included in the group of serving cells is a Downlink (DL) BWP.

11. A User Equipment (UE) for performing a dormant operation, the UE comprising:

transmitting and receiving circuitry; and at least one processor coupled to the transmitting and receiving circuitry and configured to:

receive, by the transmitting and receiving circuitry, a Radio Resource Control (RRC) configuration indicating a set of one or more dormancy cell groups from a Base Station (BS), wherein a group of serving cells belongs to a specific dormancy cell group in the set of one or more dormancy cell groups;

receive, by the transmitting and receiving circuitry, a signal including a bitmap from the BS when the UE is not in a Discontinuous Reception (DRX) active time; and switch, based on a bit in the bitmap that is associated with the specific dormancy cell group, active Bandwidth Parts (BWPs) of all activated serving cells included in the group of serving cells to a dormant BWP or to a non-dormant BWP.

12. The UE of claim 11, wherein the at least one processor is further configured to:

perform the dormant operation on a specific serving cell included in the group of serving cells in a case that the active BWP of the specific serving cell is the dormant BWP.

13. The UE of claim 11, wherein the dormant operation includes:

performing a Channel State Information (CSI) measurement; and forgoing monitoring a Physical Downlink Control Channel (PDCCH).

14. The UE of claim 11, wherein the dormant operation includes at least one of:

performing Automatic Gain Control (AGC) for a specific serving cell included in the group of serving cells, or performing beam management for the specific serving cell.

15. The UE of claim 11, wherein the at least one processor is further configured to:

forgo monitoring a Physical Downlink Control Channel (PDCCH) on a specific serving cell included in the group of serving cells in a case that the active BWP of the specific serving cell is the dormant BWP; and monitor the PDCCH on the specific serving cell in a case that the active BWP of the specific serving cell is the non-dormant BWP.

16. The UE of claim 11, wherein receiving the signal comprises receiving the signal via Downlink Control Information (DCI) that is scrambled by a Power Saving-Radio Network Temporary Identifier (PS-RNTI).

17. The UE of claim 11, wherein the signal further includes a wake-up indicator for starting a DRX On-duration timer (drx-onDurationTimer) at a beginning of a DRX cycle.

18. The UE of claim 11, wherein the at least one processor is further configured to:

receive, by the transmitting and receiving circuitry, a configuration of a DRX operation from the BS.

19. The UE of claim 11, wherein the at least one processor is further configured to:

forgo monitoring the signal on a Physical Downlink Control Channel (PDCCH) monitoring occasion when the UE is in the DRX active time, wherein the PDCCH monitoring occasion is configured for the signal.

20. The UE of claim 11, wherein the active BWP of a specific serving cell included in the group of serving cells is a Downlink (DL) BWP.

* * * * *